(12) United States Patent
Shampine

(10) Patent No.: US 10,975,677 B2
(45) Date of Patent: Apr. 13, 2021

(54) PRESSURE EXCHANGER LOW PRESSURE FLOW CONTROL

(71) Applicant: Schlumberger Technology Corporation, Sugar Land, TX (US)

(72) Inventor: Rod William Shampine, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/346,825

(22) PCT Filed: Nov. 6, 2017

(86) PCT No.: PCT/US2017/060088
§ 371 (c)(1),
(2) Date: May 1, 2019

(87) PCT Pub. No.: WO2018/085746
PCT Pub. Date: May 11, 2018

(65) Prior Publication Data
US 2020/0063545 A1 Feb. 27, 2020

Related U.S. Application Data

(60) Provisional application No. 62/417,849, filed on Nov. 4, 2016.

(51) Int. Cl.
*E21B 43/26* (2006.01)
*E21B 43/267* (2006.01)
(Continued)

(52) U.S. Cl.
CPC .......... *E21B 43/267* (2013.01); *E21B 43/261* (2013.01); *F04F 13/00* (2013.01);
(Continued)

(58) Field of Classification Search
CPC ....... E21B 43/261; E21B 43/267; F04F 13/00
See application file for complete search history.

(56) References Cited

U.S. PATENT DOCUMENTS 5,899,272 A 5/1999 Loree
5,935,490 A 8/1999 Archbold et al.
(Continued)

FOREIGN PATENT DOCUMENTS

WO 2010071994 A1 7/2010
WO 2014074939 A1 5/2014
WO 2016176531 A1 11/2016

*Primary Examiner* — Matthew R Buck
(74) *Attorney, Agent, or Firm* — Rodney Warfford

(57) ABSTRACT

Apparatus and methods for pressurizing well operations fluids. An example apparatus may include a plurality of pressure exchangers each operable to receive a first fluid via a low-pressure inlet, receive a second fluid via a high-pressure inlet to thereby pressurize and then discharge the first fluid via a high-pressure outlet, and discharge the clean fluid via a low-pressure outlet. The apparatus may further include a fluid control device fluidly connected with the pressure exchangers downstream from the low-pressure outlets. The fluid control device may be a pump operable to draw the clean fluid discharged via the low-pressure outlets and thereby reduce the pressure at the low-pressure outlets and the low-pressure inlets.

26 Claims, 9 Drawing Sheets

(51) Int. Cl.
*F04F 13/00* (2009.01)
*B01D 21/28* (2006.01)
*E21B 43/40* (2006.01)
*F04B 23/06* (2006.01)

(52) U.S. Cl.
CPC ...... *B01D 21/283* (2013.01); *B01D 2313/243* (2013.01); *E21B 43/40* (2013.01); *F04B 23/06* (2013.01)

(56) References Cited

U.S. PATENT DOCUMENTS

| | | |
|---|---|---|
| 2002/0146325 A1 | 10/2002 | Shumway |
| 2007/0023718 A1 | 2/2007 | Menconi |
| 2008/0087253 A1 | 4/2008 | Cvengros et al. |
| 2009/0180903 A1 | 7/2009 | Martin et al. |
| 2009/0301725 A1 | 12/2009 | Case et al. |
| 2010/0212156 A1 | 8/2010 | Judge et al. |
| 2011/0154802 A1 | 6/2011 | Joshi et al. |
| 2014/0048143 A1 | 2/2014 | Lehner et al. |
| 2014/0128655 A1 | 5/2014 | Arluck et al. |
| 2015/0050167 A1 | 2/2015 | Hirosawa et al. |
| 2015/0096739 A1* | 4/2015 | Ghasripoor ............. F04F 13/00 166/105 |
| 2015/0184492 A1* | 7/2015 | Ghasripoor ............. F04F 13/00 166/250.01 |
| 2016/0032702 A1* | 2/2016 | Gay .................... E21B 43/16 137/14 |
| 2016/0084269 A1 | 3/2016 | Hauge |
| 2016/0146229 A1* | 5/2016 | Martin .................. F04F 13/00 92/61 |
| 2016/0160889 A1* | 6/2016 | Hoffman ............... F04F 13/00 60/487 |
| 2016/0281487 A1* | 9/2016 | Ghasripoor ............. F04F 13/00 |
| 2017/0130743 A1* | 5/2017 | Anderson ............... F15B 3/00 |

* cited by examiner

PRESSURE EXCHANGER LOW PRESSURE FLOW CONTROL

CROSS-REFERENCE TO RELATED APPLICATIONS

This application claims the benefit of U.S. Provisional Patent Application No. 62/417,849, entitled "PRESSURE EXCHANGER LOW PRESSURE FLOW CONTROL METHODS," filed Nov. 4, 2016, the entire disclosure of which is hereby incorporated herein by reference.

BACKGROUND OF THE DISCLOSURE

A variety of fluids are used in oil and gas operations. Fluids may be pumped into the subterranean formation through the use of one or more high-pressure pumps. Dirty fluids, such as solids-laden fluids containing insoluble abrasive solid particles, can reduce functional life and increase maintenance of the high-pressure pumps.

Pressure exchangers utilized in oilfield pumping can create a variety of problems, some of which relate to flow rate and pressure control on the low-pressure side of the pressure exchangers. Pressure exchangers create a relatively high pressure drop, which is at least partially caused by high-pressure fluids (e.g., up to about 20,000 pounds per square inch (PSI)) flowing through relatively constricted pathways at relatively high velocities. On the high-pressure side of the pressure exchangers, such losses are negligible, being on the order of 50 PSI. However, on the low-pressure side, in combination with line friction and pressure drop across a control valve, the pressure drop can exceed the pressure capability of conventional mixers (i.e., blenders). Increasing the output pressure of the mixers increases internal wear rate substantially more than the increase in pressure, leading to frequent equipment failure or repair.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a fluid pressurizing system having pressure exchangers and a fluid control device. The pressure exchangers are each operable to receive a first fluid via a low-pressure inlet, receive a second fluid via a high-pressure inlet to pressurize and discharge the first fluid via a high-pressure outlet, and discharge the second fluid via a low-pressure outlet. The fluid control device is fluidly connected with the pressure exchangers downstream from the low-pressure outlets.

The present disclosure also introduces an apparatus including a wellsite system operable to inject a dirty fluid into a wellbore during well treatment operation. The wellsite system includes a first pump, a mixer, pressure exchangers, and a second pump. The first pump is operable to pressurize a clean fluid. The mixer is operable to form a dirty fluid. The pressure exchangers are fluidly connected with the first pump, the mixer, and the wellbore. Each pressure exchanger is operable to receive the dirty fluid from the mixer via a low-pressure inlet, receive the pressurized clean fluid from the first pump via a high-pressure inlet to thereby pressurize and then discharge the received dirty fluid via a high-pressure outlet, and discharge the clean fluid via a low-pressure outlet. The second pump is fluidly connected with the pressure exchangers downstream from the low-pressure outlets. The second pump is operable to draw the clean fluid discharged via the low-pressure outlets and thereby reduce pressure at the low-pressure outlets and the low-pressure inlets.

The present disclosure also introduces a method including operating pressure exchangers by injecting a first fluid into the pressure exchangers via corresponding low-pressure inlets of the pressure exchangers, injecting a second fluid into the pressure exchangers via corresponding high-pressure inlets of the pressure exchangers to thereby pressurize and then discharge the first fluid via corresponding high-pressure outlets of the pressure exchangers, and discharging the second fluid out of the pressure exchangers via corresponding low-pressure outlets of the pressure exchangers. The method also includes operating a pump to draw the second fluid discharged via the low-pressure outlets and thereby reduce the pressure at the low-pressure outlets and the low-pressure inlets.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
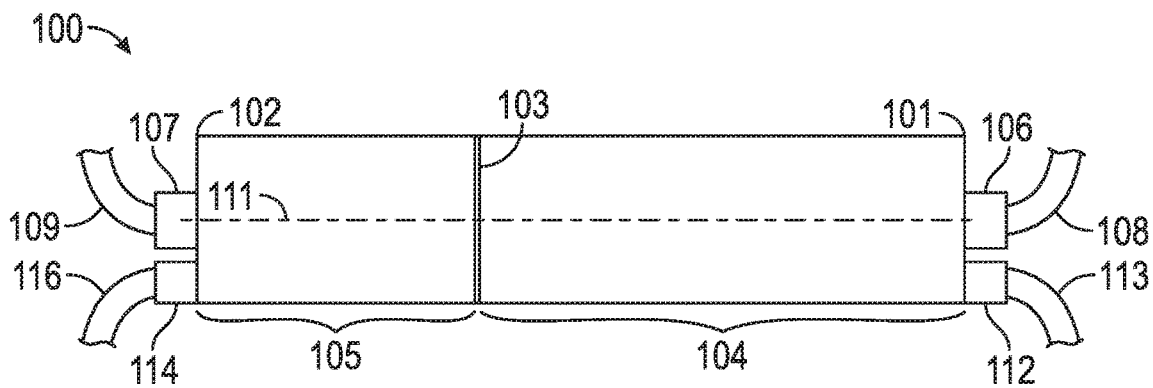
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various implementations described below. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. It should also be understood that the terms "first," "second," "third," etc., are arbitrarily assigned, are merely intended to differentiate between two or more parts, fluids, etc., and do not indicate a particular orientation or sequence.

The present disclosure introduces one or more aspects related to utilizing one or more pressure exchangers to divert a corrosive, abrasive, and/or solids-laden fluid (referred to herein as "dirty fluid") away from high-pressure pumps, instead of pumping such fluid with the high-pressure pumps. A non-corrosive, non-abrasive, and solids-free fluid (referred to herein as "clean fluid") may be pressurized by the high-pressure pumps, while the pressure exchangers, located downstream from the high-pressure pumps, transfer the pressure from the pressurized clean fluid to a low-pressure dirty fluid. Such use of pressure exchangers may facilitate improved fluid control during well treatment operations and/or increased functional life of the high-pressure pumps and other wellsite equipment fluidly coupled between the high-pressure pumps and the pressure exchangers.

As used herein, a "fluid" is a substance that can flow and conform to the outline of its container when the substance is tested at a temperature of 71° F. (22° C.) and a pressure of one atmosphere (atm) (0.1 megapascals (MPa)). A fluid may be liquid, gas, or both. A fluid may be water based or oil based. A fluid may have just one phase or more than one based. A fluid may be a heterogeneous fluid having more than one distinct phase. Example heterogeneous fluids within the scope of the present disclosure include a solids-laden fluid or slurry (such as may comprise a continuous liquid phase and undissolved solid particles as a dispersed phase), an emulsion (such as may comprise a continuous liquid phase and at least one dispersed phase of immiscible liquid droplets), a foam (such as may comprise a continuous liquid phase and a dispersed gas phase), and mist (such as may comprise a continuous gas phase and a dispersed liquid droplet phase), among other examples also within the scope of the present disclosure. A heterogeneous fluid may comprise more than one dispersed phase. Moreover, one or more of the phases of a heterogeneous fluid may be or comprise a mixture having multiple components, such as fluids containing dissolved materials and/or undissolved solids.

Plunger pumps may be employed in high-pressure oilfield pumping applications, such as for hydraulic fracturing ("frac") applications. Plunger pumps are often referred to as positive displacement pumps, intermittent duty pumps, triplex pumps, quintuplex pumps, or frac pumps, among other examples also within the scope of the present disclosure. Multiple plunger pumps may be employed simultaneously in large-scale operations, such as where tens of thousands of gallons of fluid are pumped into a wellbore. These pumps may be linked to each other with a manifold, such as may be plumbed to collect the output of the multiple pumps and direct it to the wellbore.

As described above, some fluids (e.g., fracturing fluid) may contain ingredients that are abrasive to the internal components of a pump. For example, a fracturing fluid generally contains proppant or other solid particulate material that is insoluble in a base fluid. To create fractures, the fracturing fluid may be pumped at high-pressures ranging, for example, between about 5,000 and about 15,000 pounds force per square inch (psi) or more. The proppant may initiate the fractures and/or keep the fractures propped open. The propped fractures provide highly permeably flow paths for oil and gas to flow from the subterranean formation, thereby enhancing the production of a well formed in the formation. However, the abrasive fracturing fluid may accelerate wear of the internal components of the pumps. Consequently, the repair, replacement, and maintenance expenses of the pumps can be quite high, and life expectancy can be low.

Example implementations of apparatus described herein relate generally to a fluid system for forming and pressurizing a solids-laden fluid (e.g., fracturing fluid) having predetermined concentrations of solid material for injection into a wellbore during well treatment operations. The fluid system may include a blending or mixing device for receiving and mixing a solids-free carrying fluid or gel and a solid material to form the solids-laden fluid. The fluid system may also include a fluid pressure exchanger for increasing the pressure of or otherwise energizing the solids-laden fluid formed by the mixing device before being injected into the wellbore. The fluid pressure exchanger may be utilized to pressurize the solids-laden fluid by facilitating or permitting pressure from a pressurized solids-free fluid to be transferred to a low-pressure solids-laden fluid, among other uses. The fluid pressure exchanger may comprise one or more chambers into which the low-pressure solids-laden fluid and the pressurized solids-free fluid are conducted. The solids-free fluid may be conducted into the chamber at a higher pressure than the solids-laden fluid, and may thus be utilized to pressurize the solids-laden fluid. The pressurized solids-laden fluid is then conducted from the chamber to a wellhead for injection into the wellbore. By pumping just the solids-free fluid with the pumps and utilizing the pressure exchanger to increase the pressure of the solids-laden fluid, the useful life of the pumps may be increased. Example implementations of methods described herein relate generally to utilizing the fluid system to form and pressure the solids-laden fluid for injection into the wellbore during well treatment operations. For clarity and ease of understanding, the corrosive, abrasive, and/or solids-laden fluids may be referred to hereinafter simply as "dirty fluids" and the non-corrosive, non-abrasive, and solids-free fluids may be referred to hereinafter simply as "clean fluids."

FIG. 1 is a schematic view of an example implementation of a chamber 100 of a fluid pressure exchanger for pressurizing a dirty fluid with a clean fluid according to one or more aspects of the present disclosure. The chamber 100 includes a first end 101 and a second end 102. The chamber 100 may include a border or boundary 103 between the dirty and clean fluids defining a first volume 104 and a second volume 105 within the chamber 100. The boundary 103 may be a membrane that is impermeable or semi-permeable to a fluid, such as a gas. The membrane may be an impermeable membrane in implementations in which the dirty and clean fluids are incompatible fluids, or when mixing of the dirty and clean fluids is to be substantially prevented, such as to recycle the clean fluid absent contamination by the dirty fluid. The boundary 103 may be a semi-permeable membrane in implementations permitting some mixing of the clean fluid with the dirty fluid, such as to foam the dirty fluid when the clean fluid comprises a gas.

The boundary 103 may be a floating piston or separator slidably disposed along the chamber 100. The floating piston may physically isolate the dirty and clean fluids and be movable via pressure differential between the dirty and clean fluids. The floating piston may be retained within the chamber 100 by walls or other features of the chamber 100. The density of the floating piston may be set between that of the clean and dirty fluids, such as may cause gravity to locate the floating piston at an interface of the dirty and clean fluids when the chamber 100 is oriented vertically.

The boundary 103 may also be a diffusion or mixing zone in which the dirty and clean fluids mix or otherwise interact during pressurizing operations. The boundary 103 may also not exist, such that the first and second volumes 104 and 105 form a continuous volume within the chamber 100. A first inlet valve 106 is operable to conduct the dirty fluid into the first volume 104 of the chamber 100, and a second inlet valve 107 is operable to conduct the clean fluid into the second volume 105 of the chamber 100.

Figure 2:
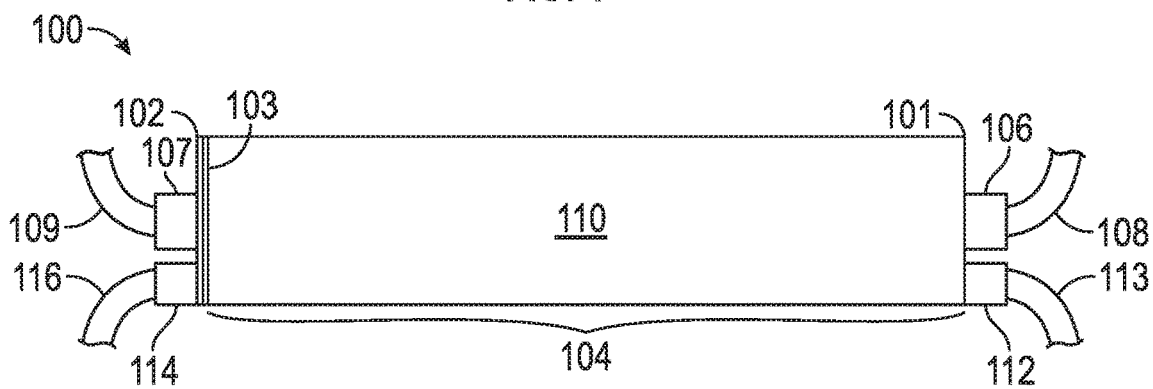
FIG. 2 is a schematic view of the apparatus shown in FIG. 1 in an operational stage according to one or more aspects of the present disclosure.

For example, FIG. 2 is a schematic view of the chamber 100 shown in FIG. 1 in an operational stage according to one or more aspects of the present disclosure, during which the dirty fluid 110 has been conducted into the chamber 100 through the first inlet valve 106 at the first end 101, such as via one or more fluid conduits 108. Consequently, the dirty fluid 110 may move the boundary 103 within the chamber 100 along a direction substantially parallel to the longitudinal axis 111 of the chamber 100, thereby increasing the first volume 104 and decreasing the second volume 105. The first inlet valve 106 may be closed after entry of the dirty fluid 110 into the chamber 100.

Figure 3:
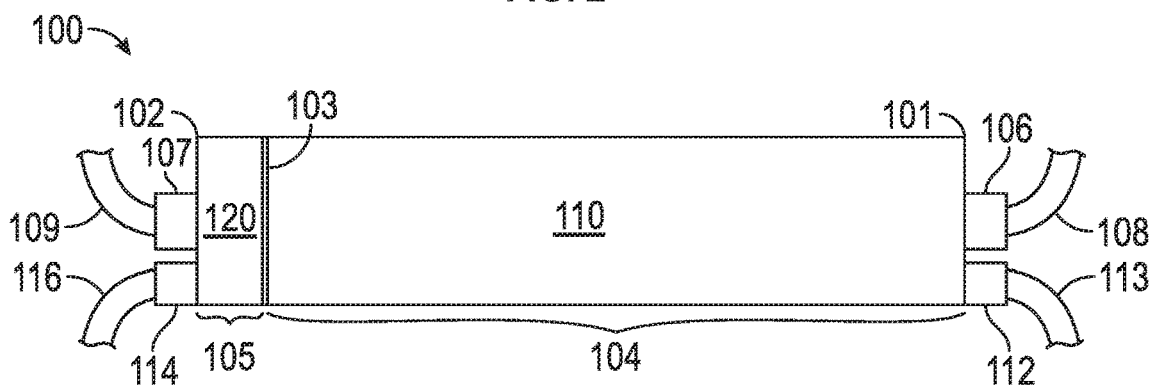
FIG. 3 is a schematic view of the apparatus shown in FIG. 2 in another operational stage according to one or more aspects of the present disclosure.

FIG. 3 is a schematic view of the chamber 100 shown in FIG. 2 in a subsequent operational stage according to one or more aspects of the present disclosure, during which a clean fluid 120 is being conducted into the chamber 100 through the second inlet valve 107 at the second end 102, such as via one or more fluid conduits 109. The clean fluid 120 may be conducted into the chamber 100 at a higher pressure compared to the pressure of the dirty fluid 110. Consequently, the higher-pressure clean fluid 120 may move the boundary 103 and the dirty fluid 110 within the chamber 100 back towards the first end 101, thereby reducing the volume of the first volume 104 and thereby pressurizing or otherwise energizing the dirty fluid 110. The clean fluid 120 may be a combustible or cryogenic gas that, upon combustion or heating, acts to pressurize the dirty fluid 110, whether instead of or in addition to the higher pressure of the clean fluid 120 acting to pressurize the dirty fluid 110. The boundary 103 and/or other components may include one or more burst discs to protect against overpressure from the clean fluid 120.

Figure 4:
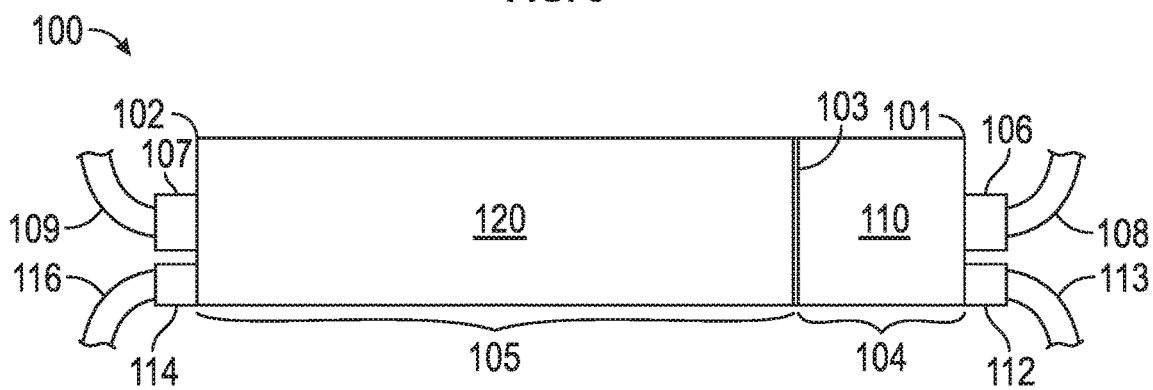
FIG. 4 is a schematic view of the apparatus shown in FIGS. 2 and 3 in another operational stage according to one or more aspects of the present disclosure.

As shown in FIG. 4, the boundary 103 may continue to reduce the first volume 104 as the pressurized dirty fluid 110 is conducted from the chamber 100 to a wellhead (not shown) at a higher pressure than when the dirty fluid 110 entered the chamber 100, such as via a first outlet valve 112 and one or more conduits 113. The second inlet valve 107 may then be closed, such as in response to pressure sensed by a pressure transducer within the chamber 100 and/or along one or more of the conduits and/or inlet valves.

After the pressurized dirty fluid 110 is discharged from the chamber 100, the clean fluid 120 may be drained via an outlet valve 114 at the second end 102 of the chamber 100 and one or more conduits 116. The discharged clean fluid 120 may be stored as waste fluid or reused during subsequent iterations of the fluid pressurizing process. For example, additional quantities of the dirty and clean fluids 110, 120 may then be introduced into the chamber 100 to repeat the pressurizing process to achieve a substantially continuous supply of pressurized dirty fluid 110.

Figure 5:
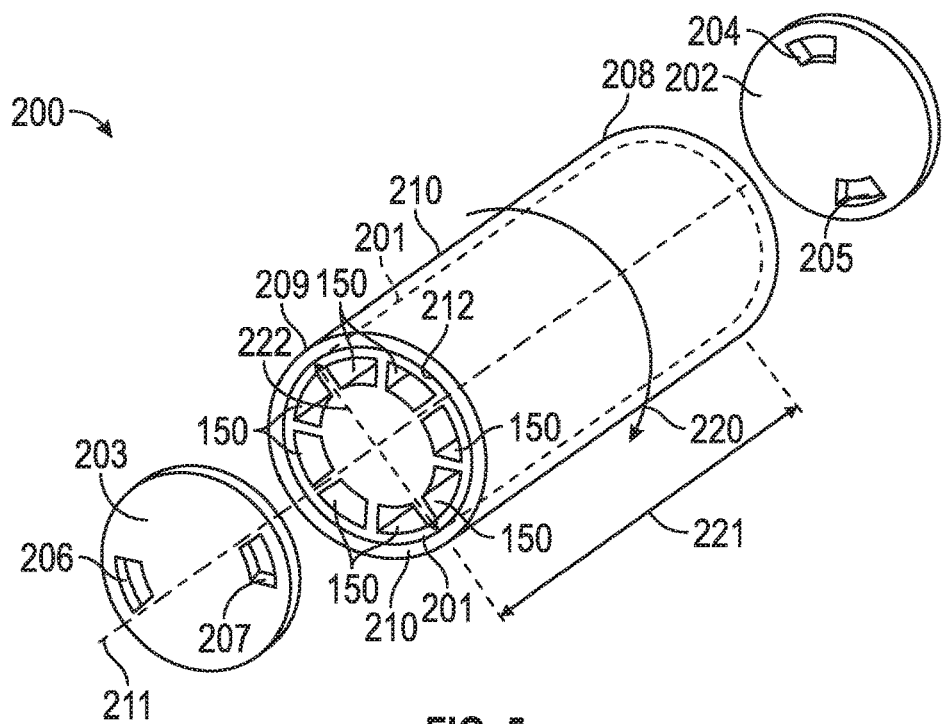
FIG. 5 is a partially exploded view of at least a portion of an example implementation of apparatus according to one or more aspects of the present disclosure.
Figure 6:
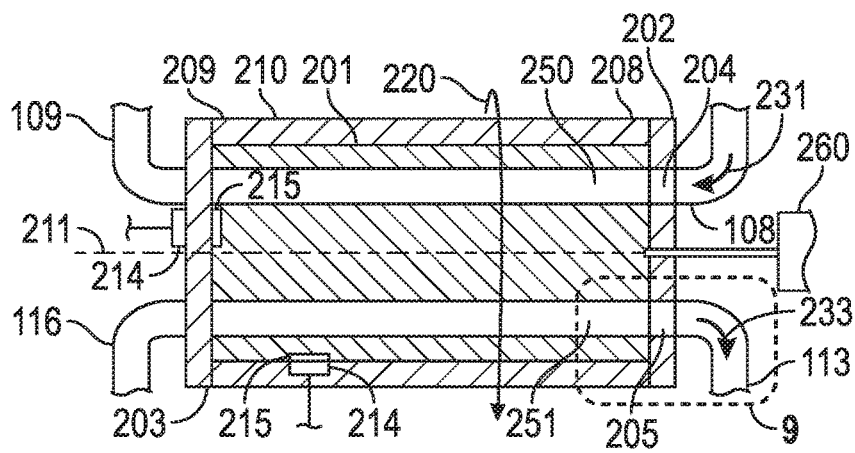
FIG. 6 is a sectional view of an example implementation of the apparatus shown in FIG. 5 according to one or more aspects of the present disclosure.
Figure 7:
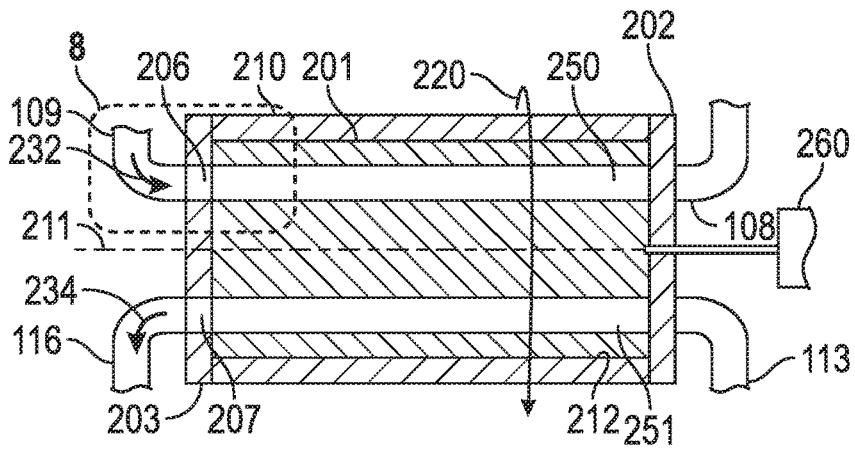
FIG. 7 is another view of the apparatus shown in FIG. 6 in a different stage of operation.

A fluid pressure exchanger comprising the apparatus shown in FIGS. 1-4 and/or others within the scope of the present disclosure may also comprise more than one of the example chambers 100 described above. FIG. 5 is a schematic view of an example fluid pressure exchanger 200 comprising multiple chambers 100 shown in FIGS. 1-4 and designated in FIG. 5 by reference numeral 150. FIGS. 6 and 7 are sectional views of the pressure exchanger 200 shown in FIG. 5. The following description refers to FIGS. 5-7, collectively.

The pressure exchanger 200 may comprise a housing 210 having a bore 212 extending between opposing ends 208, 209 of the housing 210. An end cap 202 may cover the bore 212 at the end 208 of the housing 210, and another end cap 203 may cover the bore 212 at the opposing end 209 of the housing 210. The housing 210 and the end caps 202, 203 may be sealingly engaged and statically disposed with respect to each other. The housing 210 and the end caps 202, 203 may be distinct components or members, or the housing 210 and one or both of the end caps 202, 203 may be formed as a single, integral, or continuous component or member. A rotor 201 may be slidably disposed within the bore 212 of the housing 210 and between the opposing end caps 202, 203 in a manner permitting relative rotation of the rotor 201 with respect to the housing 210 and end caps 202, 203. The rotor 201 may have a plurality of bores or chambers 150 extending through the rotor 201 and circumferentially spaced around an axis of rotation 211 extending longitudinally through the rotor 201. The rotor 201 may be a discrete member, as depicted in FIGS. 5-7, or an assembly of discrete components, such as may permit replacing worn portions of the rotor 201 and/or utilizing different materials for different portions of the rotor 201 to account for expected or actual wear.

The rotation of the rotor 201 about the axis 211 is depicted in FIG. 5 by arrow 220. Rotation of the rotor 201 may be achieved by various means. For example, rotation may be induced by utilizing force of the fluids received by the pressure exchanger 200, such as in implementations in which the fluids may be directed into the chambers 150 at a diagonal angle with respect to the axis of rotation 211, thereby imparting a rotational force to the rotor 201 to rotate the rotor 201. Rotation may also be achieved by a longitudinal geometry or configuring of at least a portion of the chambers 150 as they extend through the rotor 201. For example, an inlet portion of each chamber 150, or the entirety of each chamber 150, may extend in a helical manner with respect to the axis of rotation 211, such that the incoming stream of clean fluid imparts a rotational force to the rotor 201 to rotate the rotor 201.

Rotation may also be imparted via a motor 260 operably connected to the rotor 201. For example, the motor 260 may be an electrical or fluid powered motor connected with the rotor 201 via a shaft, a transmission, and/or other intermediate driving members, such as may extend through at least one of the end caps 202, 203 and/or the housing 210, to transfer torque to the rotor 201 to rotate the rotor 201. The motor 260 may also be connected with the rotor 201 via a magnetic shaft coupling, such as in implementations in which a driven magnet may be physically connected with the rotor 201, and a driving magnet may be located outside of the pressure exchanger 200 and magnetically connected with the driven magnet. Such implementations may permit the motor 260 to drive the rotor 201 without a shaft extending through the end caps 202, 203 and/or housing 210.

Rotation may also be imparted into the rotor 201 via an electrical motor (not shown) disposed about and connected with the rotor 201. For example, the electrical motor may comprise an electrical stator disposed about or included as part of the housing 210, and an electrical rotor connected about or included as part of the rotor 201. The electrical stator may comprise field coils or windings that generate a magnetic field when powered by electric current from a source of electric power. The electrical rotor may comprise windings or permanent magnets fixedly disposed about or included as part of the rotor 201. The electrical stator may surround the electrical rotor in a manner permitting rotation of the rotor 201/electrical rotor assembly within the housing 210/electrical stator assembly during operation of the electrical motor. The electrical motors utilized within the scope of the present disclosure may include, for example, synchronous and asynchronous electric motors.

The pressure exchanger 200 may also comprise means for sensing or otherwise determining the rotational speed of the rotor 201. For example, the rotor speed sensing means may comprise one or more sensors 214 associated the rotor 201 and operable to convert position or presence of a rotating or otherwise moving portion of the rotor 201, a feature of the rotor 201, or a marker 215 disposed in association with the rotor 201, into an electrical signal or information related to or indicative of the position and/or speed of the rotor 201. Each sensor 214 may be disposed adjacent the rotor 201 or otherwise disposed in association with the rotor 201 in a manner permitting sensing of the rotor or the marker 215 during pressurizing operations.

Each sensor 214 may sense one or more magnets on the rotor 201, one or more features on the rotor 201 that can be optically detected, conductive portions or members on the rotor 201 that can be sensed with an electromagnetic sensor, and/or facets or features on the rotor 201 that can be detected with an ultrasonic sensor, among other examples. Each sensor 214 may be or comprise a linear encoder, a capacitive sensor, an inductive sensor, a magnetic sensor, a Hall effect sensor, and/or a reed switch, among other examples. The speed sensing means may also include an intentionally imbalanced rotor 201 whose vibrations may be detected with an accelerometer and utilized to determine the rotational speed of the rotor 201.

The sensors 214 may extend through the housing 210, the end caps 202, 203, or another pressure barrier fluidly isolating the internal portion of the pressure exchanger 201 in a manner permitting the detection of the presence of the rotor 201 or the marker 215 at a selected or predetermined position. The sensor 214 and/or an electrical conductor connected with the sensor 214 may be sealed against the pressure barrier, such as to prevent or minimize fluid leakage. However, a non-magnetic housing 210 and/or end caps 202, 203 may be utilized, such as may permit a magnetic field to pass therethrough and, thus, permit the sensors 214 to be disposed on the outside of the housing 210 and/or end caps 202, 203. The sensor 214 may also be an ultrasonic transducer operable to send a pressure wave through the housing 210 and into the rotor 201, such as in implementations in which the housing 210 is a steel housing and the rotor 201 is a ceramic stator. The pressure wave may be reflected from varying markers or portions of the rotor 201 and sensed by the ultrasonic transducer to determine the rotational speed of the rotor 201.

The end caps 202, 203 may functionally replace the valves 106, 107, 112, and 114 depicted in FIGS. 1-4. For example, the first end cap 202 may be substantially disc-shaped, or may comprise a substantially disc-shaped portion, through which an inlet 204 and an outlet 205 extend. The inlet 204 may act as the first inlet valve 106 shown in FIGS. 1-4, and the outlet 205 may act as the first outlet valve 112 shown in FIGS. 1-4. Similarly, the second end cap 203 may be substantially disc-shaped, or may comprise a substantially disc-shaped portion, through which an inlet 206 and an outlet 207 extend. The inlet 206 may act as the second inlet valve 107 shown in FIGS. 1-4, and the outlet 207 may act as the second outlet valve 114 shown in FIGS. 1-4. The fluid inlets and outlets 204-207 may have a variety of dimensions and shapes. For example, as in the example implementation depicted in FIG. 5, the inlets and outlets 204-207 may have dimensions and shapes substantially corresponding to the cross-sectional dimensions and shapes of the openings of each chamber 150 at the opposing ends of the rotor 201. However, other implementations are also within the scope of the present disclosure, provided that the chambers 150 may each be sealed against the end caps 202, 203 in a manner preventing or minimizing fluid leaks. For example, the surfaces of the end caps 202, 203 that mate with the corresponding ends of the rotor 201 may comprise face seals and/or other sealing means.

In the example implementation depicted in FIG. 5, the rotor 201 comprises eight chambers 150. However, other implementations within the scope of the present disclosure may comprise as few as two chambers 150, or as many as several dozen. The rotational speed of the rotor 201 may also vary, and may be timed as per the velocity of the boundary 103 between the dirty and clean fluids and the length 221 of the chambers 150 so that the timing of the inlets and outlets 204-207 are adjusted in order to facilitate proper functioning as described herein. The rotational speed of the rotor 201 may be based on the intended flow rate of the pressurized dirty fluid exiting the chambers 150 collectively, the amount of pressure differential between the dirty and clean fluids, and/or the dimensions of the chambers 150. For example, larger dimensions of the chambers 150 and greater rotational speed of the rotor 201 relative to the end caps 202, 203 and housing 210 will increase the discharge volume of the pressurized dirty fluid.

The size and number of instances of the fluid pressure exchanger 200 utilized at a wellsite in oil and gas operations may depend on the location of the fluid pressure exchanger 200 within the process flow stream at the wellsite. For example, some oil and gas operations at a wellsite may utilize multiple pumps (such as the pumps 306 shown in FIG. 11) that each receive low-pressure dirty fluid from a common manifold (such as the manifold 308 shown in FIG. 11) and then pressurize the dirty fluid for return to the manifold. For such operations, an instance of the fluid pressure exchanger 200 may be utilized between each pump and the manifold, and/or one or more instances of the fluid pressure exchanger 200 may replace one or more of the pumps. In such implementations, the rotor 201 may have a length 221 ranging between about 25 centimeters (cm) and about 150 cm and a diameter 222 ranging between about 10 cm and about 30 cm, the cross-sectional area (flow area) of each chamber 150 may range between about 5 cm$^2$ and about 20 cm$^2$, and/or the volume of each chamber 150 may range between about 75 cubic cm (cc) and about 2500 cc. However, other dimensions are also within the scope of the present disclosure. Some oil and gas operations at a wellsite may utilize multiple pumps that each receive low-pressure dirty fluid directly from a corresponding mixer (such as the mixer 304 shown in FIG. 11) or another source of dirty fluid, and then pressurize the dirty fluid for injection directly into a well (such as the well 311 shown in FIG. 11). For such operations, an instance of the fluid pressure exchanger 200 may be utilized between each pump and the well, and/or one or more instances of the fluid pressure exchanger 200 may replace one or more of the pumps.

In some implementations, the pumps may each receive low-pressure clean fluid from the manifold (such as may be received at the manifold from a secondary fluid source) and then pressurize the clean fluid for return to the manifold. The pressurized clean fluid may then be conducted from the manifold to one or more instances of the fluid pressure exchanger 200 to be utilized to pressurize low-pressure dirty fluid received from a gel maker, proppant blender, and/or other low-pressure processing device, and the pressurized dirty fluid discharged from the fluid pressure exchanger(s) 200 may be conducted towards a well. Examples of such operations include those shown in FIGS. 12-18, among other examples within the scope of the present disclosure. In such implementations, the length 221 of the rotor 201, the diameter 222 of the rotor 201, the flow area of each chamber 150, the volume of each chamber 150, and/or the number of chambers 150 may be much larger than as described above.

FIG. 6 is a sectional view of the pressure exchanger 200 shown in FIG. 5 during an operational stage in which two of the chambers are substantially aligned with the inlet and outlet 204, 205 of the first end cap 202 but not with the inlet and outlet 206, 207 of the second end cap 203. Thus, the inlet 204 fluidly connects one of the depicted chambers 150, designated by reference number 250 in FIG. 6, with the one or more conduits 108 supplying the non-pressurized dirty fluid, such that the non-pressurized dirty fluid may be conducted into the chamber 250. At the same time, the outlet 205 fluidly connects another of the depicted chambers 150, designated by reference number 251 in FIG. 6, with the one or more conduits 113 conducting previously pressurized dirty fluid out of the chamber 251, such as for conduction into a wellbore (not shown). As the rotor 201 rotates relative to the end caps 202, 203, the chambers 250, 251 will rotate out of alignment with the inlet and outlet 204, 205, thus preventing fluid communication between the chambers 250, 251 and the respective conduits 108, 113.

FIG. 7 is another view of the apparatus shown in FIG. 6 during another operational stage in which the chambers 250, 251 are substantially aligned with the inlet and outlet 206, 207 of the second end cap 203 but not with the inlet and outlet 204, 205 of the first end cap 202. Thus, the inlet 206 fluidly connects the chamber 250 with the one or more conduits 109 supplying the pressurizing or energizing clean fluid, such that the clean fluid may be conducted into the chamber 250. At the same time, the outlet 207 fluidly connects the other chamber 251 with the one or more conduits 116 conducting previously pressurizing clean fluid out of the chamber 251, such as for recirculation to the clean fluid source (not shown). As the rotor 201 further rotates relative to the end caps 202, 203 and the housing 210, the chambers 250, 251 will rotate out of alignment with the inlet and outlet 206, 207, thus preventing fluid communication between the chambers 250, 251 and the respective conduits 109, 116.

The pressurizing process described above with respect to FIGS. 1-4 is achieved within each chamber 150, 250, 251 with each full rotation of the rotor 201 relative to the end caps 202, 203. For example, as the rotor 201 rotates relative to the end caps 202, 203 and the housing 210, the non-pressurized dirty fluid is conducted into the chamber 250 during the portion of the rotation in which the chamber 250 is in fluid communication with inlet 204 of the first end cap 202, as indicated in FIG. 6 by arrow 231. The rotation is continuous, such that the flow rate of non-pressurized dirty fluid into the chamber 250 increases as the chamber 250 comes into alignment with the inlet 204, and then decreases as the chamber 250 rotates out of alignment with the inlet 204. Further rotation of the rotor 201 relative to the end caps 202, 203 permits the pressurizing clean fluid to be conducted into the chamber 250 during the portion of the rotation in which the chamber 250 is in fluid communication with the inlet 206 of the second end cap 203, as indicated in FIG. 7 by arrow 232. The influx of the pressurizing clean fluid into the chamber 250 pressurizes the dirty fluid, such as due to the pressure differential between the dirty and clean fluids described above with respect to FIGS. 1-4.

Further rotation of the rotor 201 relative to the end caps 202, 203 and the housing 210 permits the pressurized dirty fluid to be conducted out of the chamber 250 during the portion of the rotation in which the chamber 250 is in fluid communication with the outlet 205 of the first end cap 202, as indicated in FIG. 6 by arrow 233. The discharged fluid may substantially comprise just the (pressurized) dirty fluid or a mixture of the dirty and clean fluids (also pressurized), depending on the timing of the rotor 201 and perhaps whether the chambers include the boundary 103 shown in FIGS. 1-4. Further rotation of the rotor 201 relative to the end caps 202, 203 permits the reduced-pressure clean fluid to be conducted out of the chamber 250 during the portion of the rotation in which the chamber 250 is in fluid communication with the outlet 207 of the second end cap 203, as indicated in FIG. 7 by arrow 234. The pressurizing process then repeats as the rotor 201 further rotates and the chamber 250 again comes into alignment with the inlet 204 of the first end cap 202.

Depending on the number and size of the chambers 150, the non-pressurized dirty fluid inlet 204 and the pressurizing clean fluid inlet 206 may be wholly or partially misaligned with each other about the central axis 211, such that the dirty fluid may be conducted into the chamber 150 to entirely or mostly fill the chamber 150 before the clean fluid is conducted into that chamber 150. The non-pressurized dirty fluid inlet 204 is completely closed to fluid flow from the conduit 108 before the pressurizing clean fluid inlet 206 begins opening. The pressurized dirty fluid outlet 205 and the reduced-pressure clean fluid outlet 207, however, may be partially open when the pressurizing clean fluid inlet 206 is permitting the clean fluid into the chamber 150. Similarly, the non-pressurized dirty fluid inlet 204 may be partially open when the pressurized dirty fluid outlet 205 and/or the reduced-pressure clean fluid outlet 207 is at least partially open.

The pressurized dirty fluid outlet 205 and the reduced-pressure clean fluid outlet 207 may be wholly or partially misaligned with each other about the central axis 211. For example, the pressurized dirty fluid (and perhaps a pressurized mixture of the dirty and clean fluids) may be substantially discharged from a chamber 150 via the pressurized dirty fluid outlet 205 before the remaining reduced-pressure clean fluid is permitted to exit through the reduced-pressure clean fluid outlet 207. As the rotor 201 continues to rotate relative to the end caps 202, 203 and the housing 210, the pressurized dirty fluid outlet 205 becomes closed to fluid flow, and the reduced-pressure clean fluid outlet 207 becomes open to discharge the remaining reduced-pressure clean fluid. Thus, the reduced-pressure clean fluid outlet 207 may be completely closed to fluid flow while the pressurized dirty fluid (or mixture of the dirty and clean fluids) is discharged from the chamber 150 to the wellhead. Complete closure of the reduced-pressure clean fluid outlet 207 may permit the pressurized fluid to maintain a higher-pressure flow to the wellhead.

The inlets and outlets 204-207 may also be configured to permit fluid flow into and out of more than one chamber 150 at a time. For example, the non-pressurized dirty fluid inlet 204 may be sized to simultaneously fill more than one chamber 150, the inlet and outlets 204-207 may be configured to permit non-pressurized dirty fluid to be conducted into a chamber 150 while the reduced-pressure clean fluid is simultaneously being discharged from that chamber 150. Depending on the size of the rotor 201 and the chambers 150, the fluid properties of the dirty and clean fluids, and the rotational speed of the rotor 201 relative to the end caps 202, 203, the pressurizing process within each chamber 150 may also be achieved in less than one rotation of the rotor 201 relative to the end caps 202, 203 and the housing 210, such as in implementations in which two, three, or more iterations of the pressurizing process is achieved within each chamber 150 during a single rotation of the rotor 201.

The flow of dirty fluid out of the pressure exchanger 200 via the fluid conduit 116 may be prevented or otherwise minimized by controlling the timing of the opening and closing of the fluid inlets 204, 206 and outlets 205, 207 of the pressure exchanger 200. For example, during the pressurizing operations, as the chambers 150 rotate, each chamber 150 is in turn aligned and, thus, fluidly connected with the low-pressure inlet 204 to receive the dirty fluid and the low-pressure outlet 207 to discharge the clean fluid. As the dirty fluid fills the chamber 150, the boundary 103 moves toward the low-pressure outlet 207 as the clean fluid is pushed out of the chamber 150. However, the rotation of the rotor 201 seals off the outlet 207 of the chamber 150 when or just before the boundary 103 reaches the outlet 207 to prevent or minimize the dirty fluid from entering into the fluid conduit 116. The chamber 150 then becomes aligned with the high-pressure inlet 206 and the high-pressure outlet 205 to permit the high-pressure clean fluid to enter the chamber 150 via the inlet 206 to push the dirty fluid from the chamber 150 via the outlet 205 at an increased pressure. As the clean fluid fills the chamber 150, the boundary 103 moves toward the high-pressure outlet 205 as the dirty fluid is pushed out of the chamber 150. However, the rotation of the rotor 201 seals off the outlet 205 of the chamber 150 when or just before the boundary 103 reaches the outlet 205 to prevent or minimize the clean fluid from entering into the fluid conduit 113. The clean fluid left in the chamber 150 may be pushed out through the fluid conduit 116 by the dirty fluid when the chamber 150 again becomes aligned with the low-pressure inlet 204 to receive the dirty fluid and the low-pressure outlet 207 to discharge the clean fluid. Such cycle may be continuously repeated to continuously receive and pressurize the stream of dirty fluid to form a substantially continuous or uninterrupted stream of dirty fluid.

Figure 8:
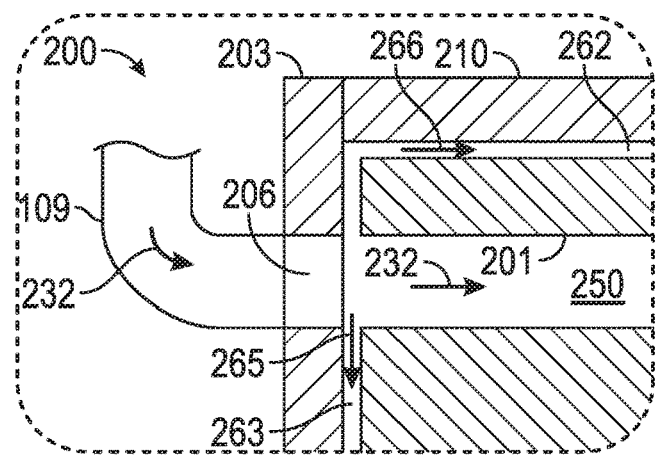
FIG. 8 is an enlarged view of the apparatus shown in FIG. 7 according to one or more aspects of the present disclosure.
Figure 9:
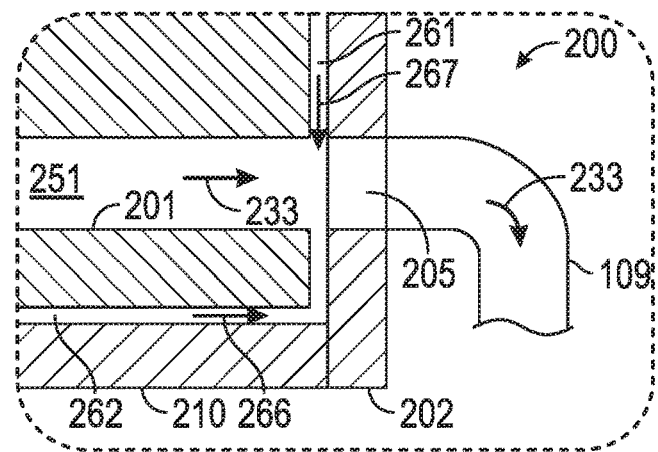
FIG. 9 is an enlarged view of the apparatus shown in FIG. 6 according to one or more aspects of the present disclosure.

FIGS. 8 and 9 are enlarged views of portions of the pressure exchanger 200 shown in FIGS. 7 and 6, respectively, according to one or more aspects of the present disclosure. The following description refers to FIGS. 6-9, collectively.

Small gaps or spaces 261, 262, 263 may be maintained between the rotor 201 and the housing 210, and between the rotor 201 and the end caps 202, 203, to permit rotation of the rotor 201 within the housing 210 and the end caps 202, 203. For clarity, the housing 210 and the end caps 202, 203 may be collectively referred to hereinafter as a "housing assembly." The spaces 261, 262, 263 may permit fluid flow between the rotor 201 and the housing assembly. For example, dirty fluid within the pressure exchanger 200 may flow through the space 261 along the end cap 202 from the high-pressure outlet 205 to the low-pressure fluid inlet 204, and through the spaces 261, 262, 263 along the housing 210 and the end caps 202, 203 from the high-pressure outlet 205 to the clean fluid low-pressure outlet 207. Clean fluid within the pressure exchanger 200 may flow through the space 263 along the end cap 203 from the high-pressure inlet 206 to the low-pressure outlet 207, as indicated by arrow 265, and through the spaces 261, 262, 263 along the housing 210 and the end caps 202, 203 from the high-pressure inlet 206 to the dirty fluid inlet and outlet 204, 205, as indicated by arrows 265, 266, 267.

The fluid flow through the spaces 261, 262, 263 within the pressure exchanger 200 may form a fluid film or layer operating as a hydraulic bearing and/or otherwise providing lubrication between the rotating rotor 201 and the static housing assembly, such as may prevent or reduce contact or friction between the rotor 201 and the housing assembly during pressurizing operations. The flow of fluids through the spaces 261, 262, 263 may be biased such that substantially just the clean fluid, and not the dirty fluid, flows through the spaces 261, 262, 263 during pressurizing operations, as indicated by arrows 265, 266, 267. Biasing the flow of clean fluid through the spaces 261, 262, 263 may also cause the clean/dirty fluid boundary 103 (shown in FIGS. 1-4) to maintain a net velocity directed toward the dirty fluid outlet 205. Accordingly, biasing the flow of clean fluid may result in substantially just the clean fluid being communicated through the spaces 261, 262, 263, such as to prevent or minimize friction or wear caused by the dirty fluid between the rotor 201 and the housing assembly. Biasing the flow of the clean fluid may also result in substantially just the clean fluid being discharged via the clean fluid outlet 207, such as to prevent or minimize contamination of the clean fluid discharged from the pressure exchanger 200. The apparatus and method implemented to bias the flow of clean fluid through the spaces 261, 262, 263 is further described below.

Figure 10:
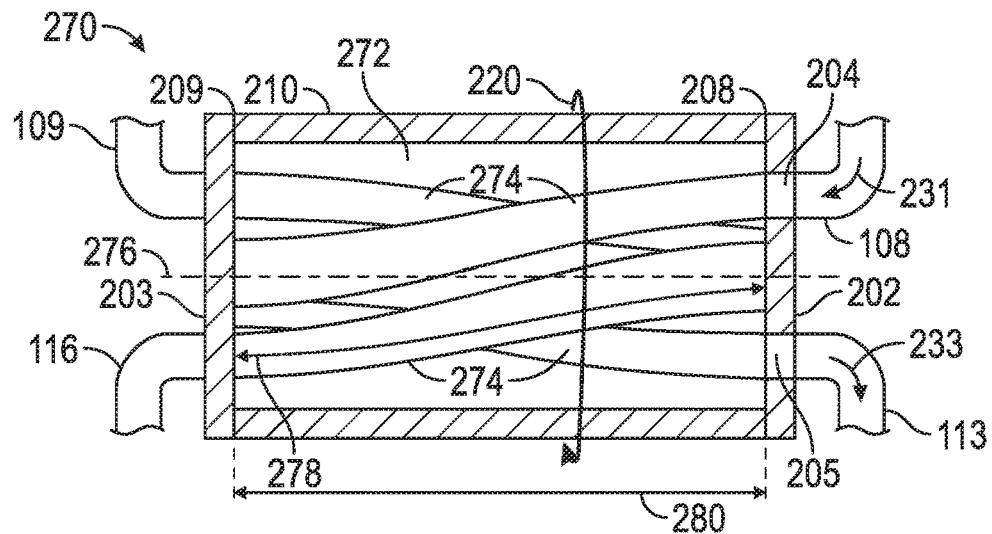
FIG. 10 is a sectional view of another example implementation of the apparatus shown in FIG. 5 according to one or more aspects of the present disclosure.

FIG. 10 is a sectional view of another example implementation of the pressure exchanger 200 shown in FIG. 5 according to one or more aspects of the present disclosure and designated in FIG. 10 by reference numeral 270. The pressure exchanger 270 is substantially similar in structure and operation to the pressure exchanger 200, including where indicated by like reference numbers, except as described below.

The pressure exchanger 270 may include a rotor 272 slidably disposed within the bore of the housing 210 and between the opposing end caps 202, 203 in a manner permitting relative rotation of the rotor 272 with respect to the housing 210 and the end caps 202, 203. The rotor 272 may have multiple bores or chambers 274 extending through the rotor 272 between the opposing ends 208, 209 of the housing 210 and circumferentially spaced around an axis of rotation 276 extending longitudinally along the rotor 272. For the sake of clarity, cross-hatching of the rotor 272 is removed from FIG. 10, and just four chambers 274 are depicted, it being understood that other chambers 274 may also exist.

The chambers 274 extend through the rotor 272 in a helical manner about or otherwise with respect to the axis of rotation 276. As described above, such helical chamber implementations may be utilized to impart rotation to the rotor 272 instead of with a separate motor 260 or other rotary driving means. Such helical chamber implementations may also permit the length 278 of the chambers 274 to be greater than the axial length 280 of the rotor 272, which may permit the axial length 280 of the rotor 272 to be reduced. The increased length 278 of the chambers 274 may also permit the rotor 272 to be rotated at slower speeds than a rotor having chambers that extend substantially parallel with respect to the axis of rotation.

The pressure exchangers 200, 270 shown in FIGS. 5-10 and/or otherwise within the scope of the present disclosure may utilize various forms of the dirty and clean fluids described above. For example, the dirty fluid may be a high-density and/or high-viscosity, solids-laden fluid comprising insoluble solid particulate material and/or other ingredients that may compromise the life or maintenance of pumps disposed downstream of the fluid pressure exchangers 200, 270, especially when such pumps are operated at higher pressures. Examples of the dirty fluid utilized in oil and gas operations may include treatment fluid, drilling fluid, spacer fluid, workover fluid, a cement composition, fracturing fluid, acidizing fluid, stimulation fluid, and/or combinations thereof, among other examples also within the scope of the present disclosure. The dirty fluid may be a foam, a slurry, an emulsion, or a compressible gas. The viscosity of the dirty fluid may be sufficient to permit transport of solid additives or other solid particulate material (collectively referred to hereinafter as "solids") without appreciable settling or segregation. Chemicals, such as biopolymers (e.g., polysaccharides), synthetic polymers (e.g., polyacrylamide and its derivatives), crosslinkers, viscoelastic surfactants, oil gelling agents, low molecular weight organogelators, and phosphate esters, may also be included in the dirty fluid, such as to control viscosity of the dirty fluid.

The composition of the clean fluid may permit the clean fluid to be pumped at higher pressures with reduced adverse effects on the downstream and/or other pumps. For example, the clean fluid may be a solids-free fluid that does not include insoluble solid particulate material or other abrasive ingredients, or a fluid that includes low concentrations of insoluble solid particulate material or other abrasive ingredients. The clean fluid may be a liquid, such as water (including freshwater, brackish water, or brine), a gas (including a cryogenic gas), or combinations thereof. The clean fluid may also include substances, such as tracers, that can be transferred to the dirty fluid upon mixing within the chambers 150, 250, 274, or upon transmission through a semi-permeable implementation of the boundary 103. The viscosity of the clean fluid may also be increased, such as to minimize or reduce viscosity contrast between the dirty and clean fluids. Viscosity contrast may result in channeling of the lower viscosity fluid through the higher viscosity fluid. The clean fluid may be viscosified utilizing the same chemicals and/or techniques described above with respect to the dirty fluid.

The clean and/or dirty fluid may be chemically modified, such as via one or more fluid additives temporarily (or regularly) injected into the clean and/or dirty fluids to produce a reaction at the clean/dirty boundary 103 that acts to stabilize the boundary 103 (e.g., a membrane, mixing zone). For example, viscosity modification may be utilized to help form a substantially flat flow profile within the chambers 150, 250, 274. Also, one or repeated pulses of a crosslinker applied to the clean fluid may be utilized to form crosslinked gel pills in the chambers 150, 250, 274 to act as boundary stabilizers. Such stabilizers may be safely pumped into the well and replaced over time.

Furthermore, the clean and dirty fluids may be selected or formulated such that a reaction between the clean and dirty fluids creates a physical change at the clean/dirty boundary 103 that stabilizes the boundary 103. For example, the clean and dirty fluids may crosslink when interacting at the boundary 103 to produce a floating, viscous plug. The clean and dirty fluids may be formulated such that the plug or another product of such reaction may not damage downstream components when trimmed off and injected into the well by the action of the outlet 205 or another discharge valve.

The following are additional examples of the dirty and clean fluids that may be utilized during oil and gas operations. However, the following are merely examples, and are not considered to be limiting to the dirty and clean fluids and that may also be utilized within the scope of the present disclosure.

For fracturing operations, the dirty fluid may be a slurry, with a continuous phase comprising water and a dispersed phase comprising proppant (including foamed slurries), including implementations in which the dispersed proppant includes two or more different size ranges and/or shapes, such as may optimize the amount of packing volume within the fractures. The dirty fluid may also be a cement composition (including foamed cements), or a compressible gas. For such fracturing implementations, the clean fluid may be a liquid comprising water, a foam comprising water and gas, a gas, a mist, or a cryogenic gas.

For cementing operations, including squeeze cementing, the dirty fluid may be a cement composition comprising water as a continuous phase and cement as a dispersed phase, or a foamed cement composition. For such cementing implementations, the clean fluid may be a liquid comprising water, a foam comprising water and gas, a gas, a mist, or a cryogenic gas.

For drilling, workover, acidizing, and other wellbore operations, the dirty fluid may be a homogenous solution comprising water, soluble salts, and other soluble additives, a slurry with a continuous phase comprising water and a dispersed phase comprising additives that are insoluble in the continuous phase, an emulsion or invert emulsion comprising water and a hydrocarbon liquid, or a foam of one or more of these examples. In such implementations, the clean fluid may be a liquid comprising water, a foam comprising water and gas, a gas, a mist, or a cryogenic gas.

In the above example implementations, and/or others within the scope of the present disclosure, the dirty fluid 110 may include proppant; swellable or non-swellable fibers; a curable resin; a tackifying agent; a lost-circulation material; a suspending agent; a viscosifier; a filtration control agent; a shale stabilizer; a weighting agent; a pH buffer; an emulsifier; an emulsifier activator; a dispersion aid; a corrosion inhibitor; an emulsion thinner; an emulsion thickener; a gelling agent; a surfactant; a foaming agent; a gas; a breaker; a biocide; a chelating agent; a scale inhibitor; a gas hydrate inhibitor; a mutual solvent; an oxidizer; a reducer; a friction reducer; a clay stabilizing agent; an oxygen scavenger; cement; a strength retrogression inhibitor; a fluid loss additive; a cement set retarder; a cement set accelerator; a light-weight additive; a de-foaming agent; an elastomer; a mechanical property enhancing additive; a gas migration control additive; a thixotropic additive; and/or combinations thereof.

Figure 11:
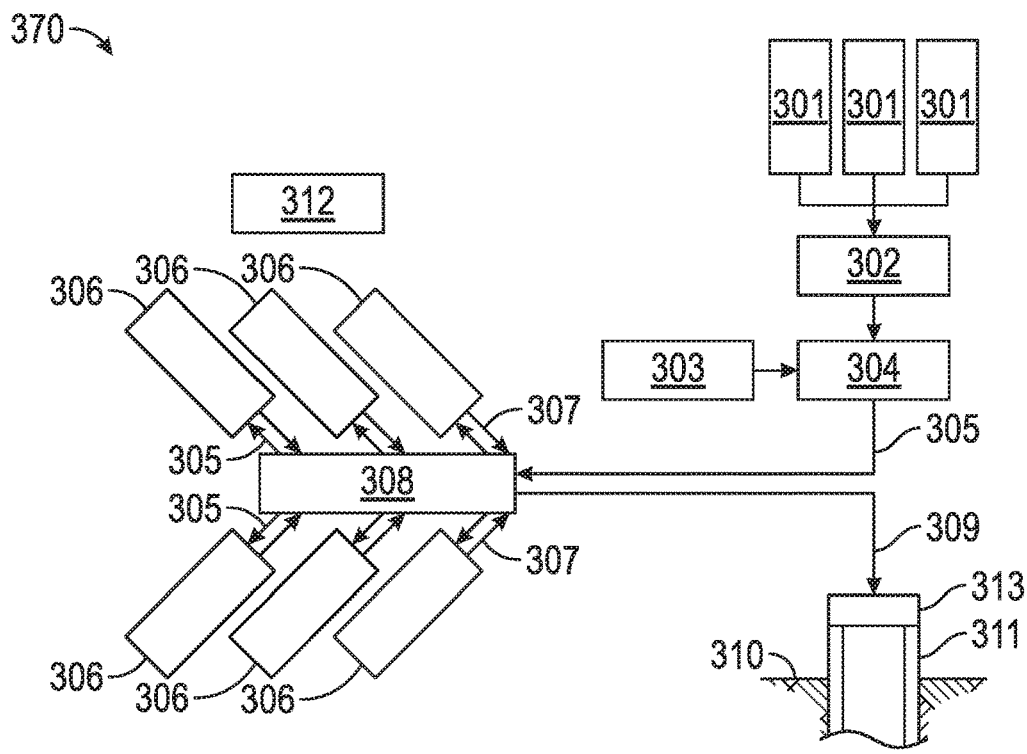
FIG. 11 is a schematic view of at least a portion of an example implementation of apparatus according to one or more aspects of the present disclosure.

FIG. 11 is a schematic view of an example wellsite system 370 that may be utilized for pumping a fluid from a wellsite surface 310 to a well 311 during a well treatment operation. Water from a plurality of water tanks 301 may be substantially continuously pumped to a gel maker 302, which mixes the water with a gelling agent to form a carrying fluid or gel, which may be a clean fluid. The gel may be substantially continuously pumped into a blending/mixing device, hereinafter referred to as a mixer 304. Solids, such as proppant and/or other solid additives stored in one or more solids containers 303, may be intermittently or substantially continuously pumped into the mixer 304 to be mixed with the gel to form a substantially continuous stream or supply of treatment fluid, which may be a dirty fluid. The treatment fluid may be pumped from the mixer 304 to a plurality of plunger, frac, and/or other pumps 306 through a system of conduits 305 and a manifold 308. Each pump 306 pressurizes the treatment fluid, which is then returned to the manifold 308 through another system of conduits 307. The stream of treatment fluid is then directed to the well 311 via a wellhead 313 through a system of conduits 309. A control unit 312 may be operable to control various portions of such processing via wired and/or wireless communications (not shown).

Figure 12:
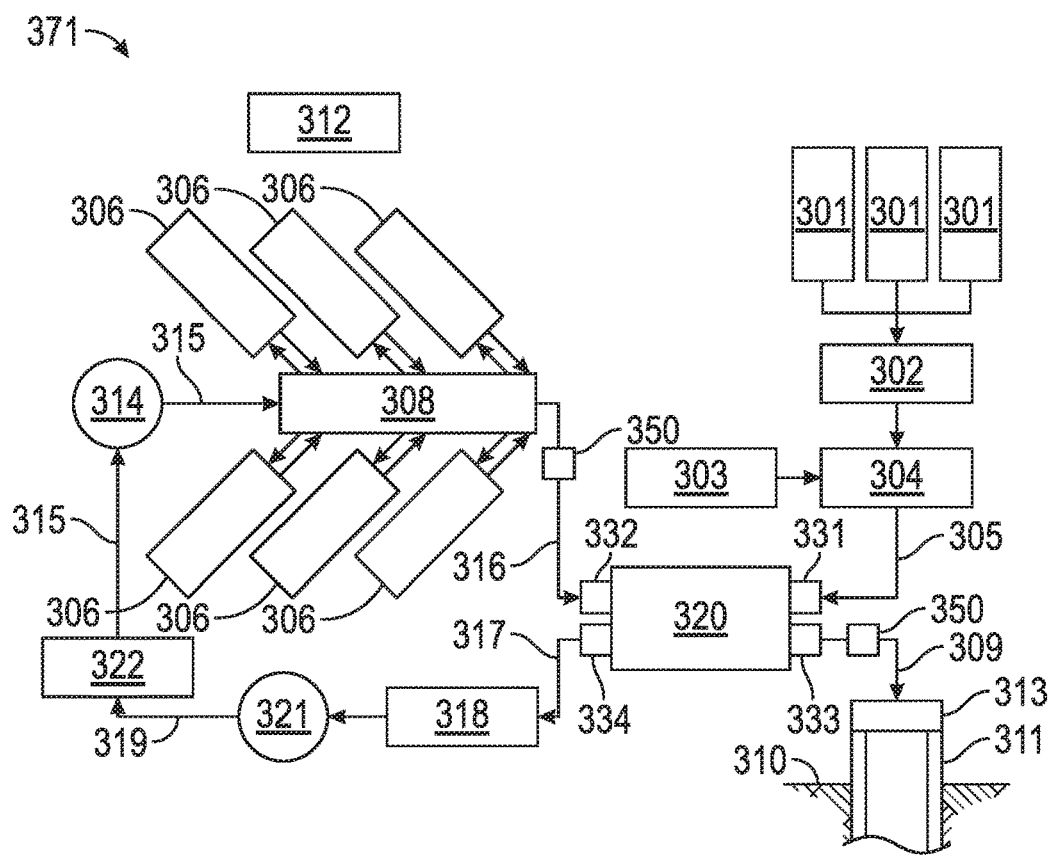
FIG. 12 is a schematic view of at least a portion of an example implementation of apparatus according to one or more aspects of the present disclosure.

FIG. 12 is a schematic view of an example implementation of another wellsite system 371 according to one or more aspects of the present disclosure. The wellsite system 371 comprises one or more similar features of the wellsite system 370 shown in FIG. 11, including where indicated by like reference numbers, except as described below.

The wellsite system 371 includes a fluid pressure exchanger 320, which may be utilized to eliminate or reduce pumping of dirty fluid through the pumps 306. The dirty fluid may be conducted from the mixer 304 to one or more chambers 100/150/250/251/274 of the fluid pressure exchanger 320 via the conduit system 305. The fluid pressure exchanger 320 may be, comprise, and/or otherwise have one or more aspects in common with the apparatus shown in one or more of FIGS. 1-10. Thus, as similarly described above with respect to FIGS. 1-10, the fluid pressure exchanger 320 comprises a non-pressurized dirty fluid inlet 331, a pressurized clean fluid inlet 332, a pressurized fluid discharge or outlet 333, and a reduced-pressure fluid discharge or outlet 334. Consequently, the pumps 306 may conduct the clean fluid to and from the manifold 308 and then to the pressurized clean fluid inlet 332 of the fluid pressure exchanger 320, where the pressurized clean fluid may be utilized to pressurize the dirty fluid received at the non-pressurized dirty fluid inlet 331 from the mixer 304.

A centrifugal or other type of pump 314 may supply the clean fluid to the manifold 308 from one or more holding or frac tanks 322 through a conduit system 315. An additional source of fluid to be pressurized by the manifold 308 may be flowback fluid from the well 311. The pressurized clean fluid is conducted from the manifold 308 to one or more chambers of the fluid pressure exchanger 320 via a conduit system 316. The pressurized fluid discharged from the fluid pressure exchanger 320 is then conducted to the wellhead 313 of the well 311 via a conduit system 309. The reduced-pressure clean fluid remaining in the fluid pressure exchanger 320 (or chamber 100/150 thereof) may then be conducted to one or more settling tanks/pits 318 via a conduit system 317, where the fluid may be recycled back into the high-pressure stream via a centrifugal or other type of pump 321 and a conduit system 319, such as to the tank(s) 322.

The wellsite system 371 may further comprise pressure sensors 350 operable to generate electric signals and/or other information indicative of pressure of the clean fluid upstream of the pressure exchanger 320 and/or pressure of the dirty fluid discharged from the pressure exchanger 320. For example, the pressure sensors 350 may be fluidly connected along the fluid conduits 309, 316. Additional pressure sensors may also be fluidly connected along the fluid conduits 305, 317 such as may be utilized to monitor pressure of the low-pressure clean and dirty fluids.

Some of the components, such as conduits, valves, and the manifold 308, may be configured to provide dampening to accommodate pressure pulsations. For example, liners that expand and contract may be employed to prevent problems associated with pumping against a closed valve due to intermittent pumping of the high-pressure fluid stream.

Figure 13:
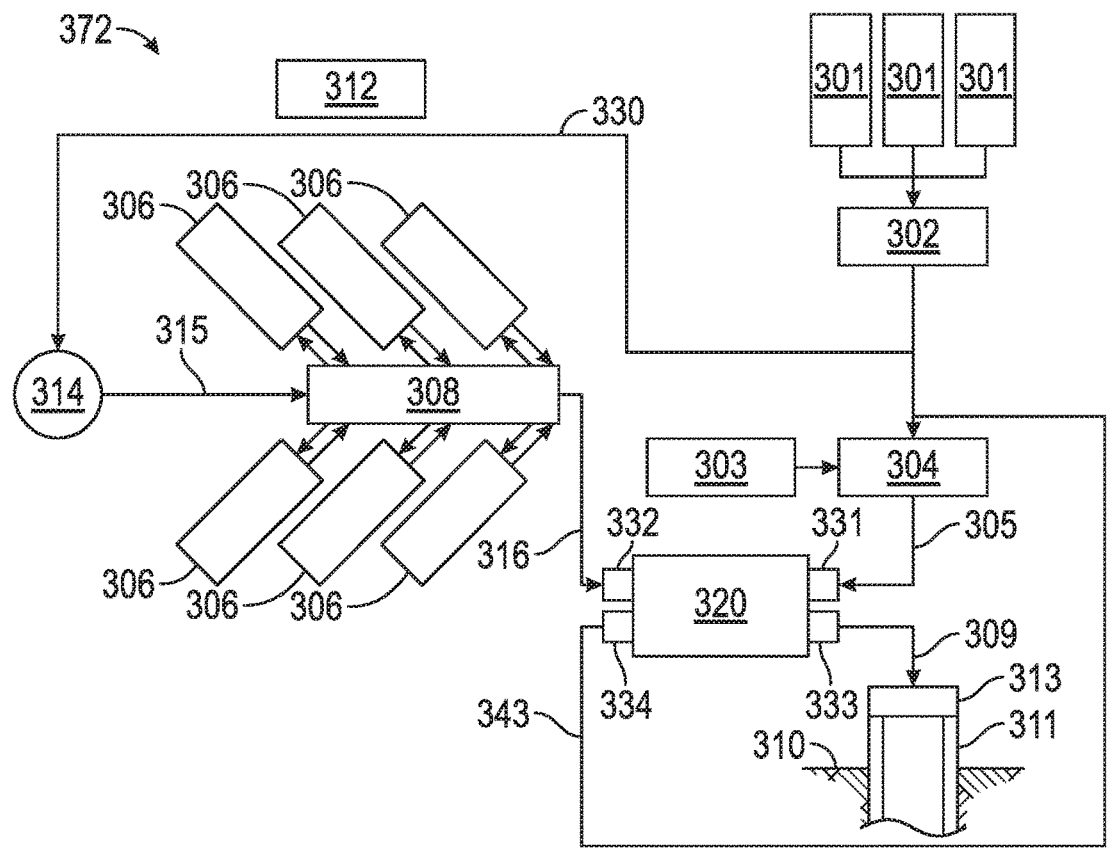
FIG. 13 is a schematic view of at least a portion of an example implementation of apparatus according to one or more aspects of the present disclosure.

FIG. 13 is a schematic view of an example implementation of another wellsite system 372 according to one or more aspects of the present disclosure. The wellsite system 372 is substantially similar in structure and operation to the wellsite system 371, including where indicated by like reference numbers, except as described below.

In the wellsite system 372, the clean fluid may be conducted to the manifold 308 via a conduit system 330, the pump 314, and the conduit system 315. That is, the fluid stream leaving the gel maker 302 may be split into a low-pressure side, for utilization by the mixer 304, and a high-pressure side, for pressurization by the manifold 308. Similarly, although not depicted in FIG. 13, the fluid stream entering the gel maker 302 may be split into the low-pressure side, for utilization by the gel maker 302, and the high-pressure side, for pressurization by the manifold 308. Thus, the clean fluid stream and the dirty fluid stream may have the same source, instead of utilizing the tank 322 or other separate clean fluid source.

FIG. 13 also depicts the option for the reduced-pressure fluid discharged from the fluid pressure exchanger 320 to be recycled back into the low-pressure clean fluid stream between the gel maker 302 and the mixer 304 via a conduit system 343. In such implementations, the flow rate of the proppant and/or other ingredients from the solids container 303 into the mixer 304 may be regulated based on the concentration of the proppant and/or other ingredients entering the low-pressure stream from the conduit system 343. The flow rate from the solids container 303 may be adjusted to decrease the concentration of proppant and/or other ingredients based on the concentrations in the fluid being recycled into the low-pressure stream. Similarly, although not depicted in FIG. 13, the reduced-pressure fluid discharged from the fluid pressure exchanger 320 may be recycled back into the low-pressure flow stream before the gel maker 302, or perhaps into the low-pressure flow stream between the mixer 304 and the fluid pressure exchanger 320.

Figure 14:
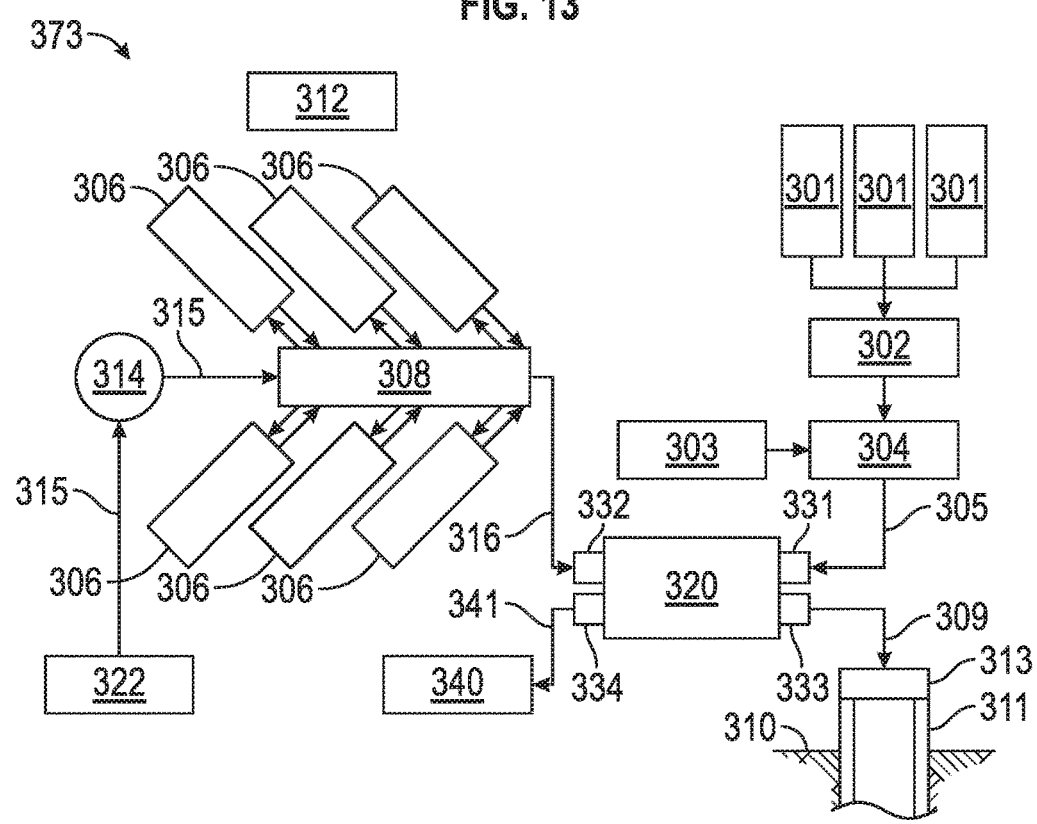
FIG. 14 is a schematic view of at least a portion of an example implementation of apparatus according to one or more aspects of the present disclosure.

FIG. 14 is a schematic view of an example implementation of another wellsite system 373 according to one or more aspects of the present disclosure. The wellsite system 373 is substantially similar in structure and operation to the wellsite system 372, including where indicated by like reference numbers, except as described below.

In the wellsite system 373, the source of the clean fluid is the tank 322, and the reduced-pressure fluid discharged from the fluid pressure exchanger 320 is not recycled back into the high-pressure stream, but is instead directed to a tank 340 via a conduit system 341. However, in a similar implementations, the reduced-pressure fluid discharged from the fluid pressure exchanger 320 may not be recycled back into the high-pressure stream, as depicted in FIG. 13. In either case, utilizing the tank 322 or other source of the clean fluid separate from the discharge of the gel maker 302 and the fluid pressure exchanger 320 may permit a single pass clean fluid system with very low probability of proppant entering the pumps 306.

Figure 15:
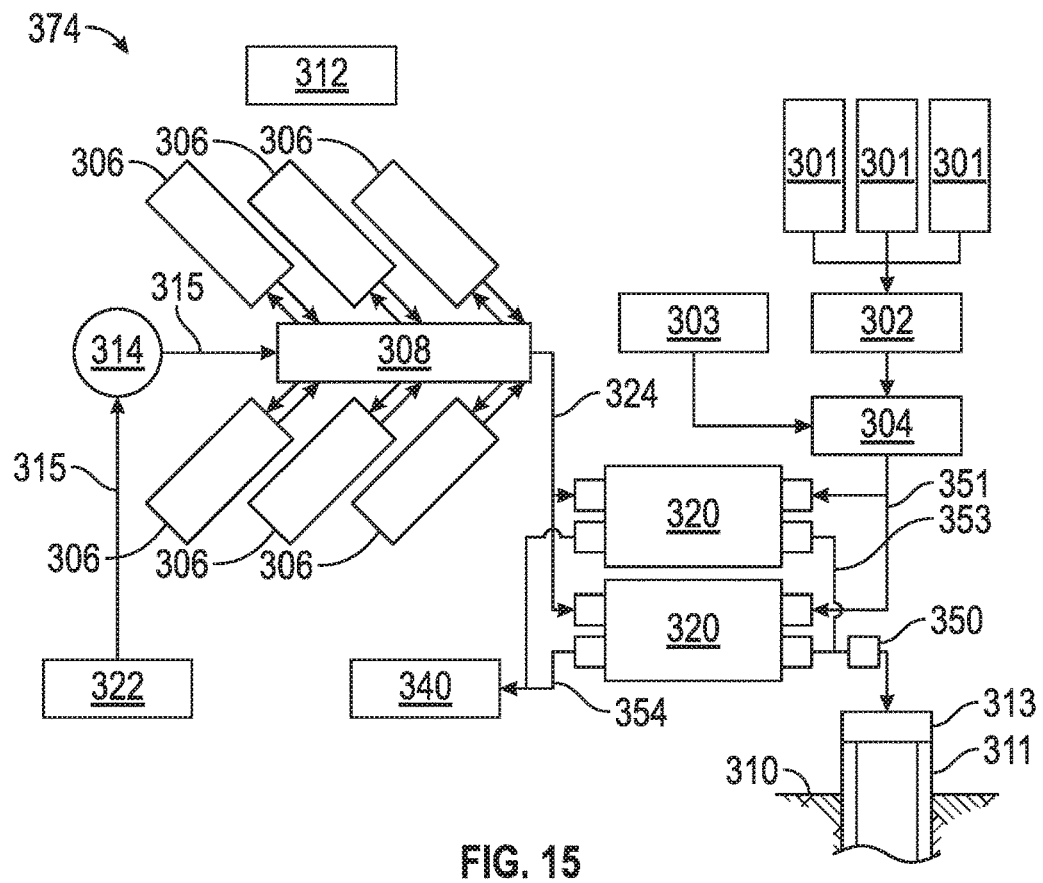
FIG. 15 is a schematic view of at least a portion of an example implementation of apparatus according to one or more aspects of the present disclosure.

FIG. 15 is a schematic view of an example implementation of another wellsite system 374 according to one or more aspects of the present disclosure. The wellsite system 374 is substantially similar in structure and operation to the wellsite system 373, including where indicated by like reference numbers, except as described below.

Unlike the wellsite system 373, the wellsite system 374 utilizes multiple instances of the fluid pressure exchanger 320. The low-pressure discharge from the mixer 304 may be split into multiple streams each conducted to a corresponding one of the fluid pressure exchangers 320 via a conduit system 351. Similarly, the high-pressure discharge from the manifold 308 may be split into multiple streams each conducted to a corresponding one of the fluid pressure exchangers 320 via a conduit system 352. The pressurized fluid discharged from the fluid pressure exchangers 320 may be combined and conducted towards the well 311 via a conduit system 353, and the reduced-pressure discharge from the fluid pressure exchangers 320 may be combined or separately conducted to the tank 340 via a conduit system 354.

Figure 16:
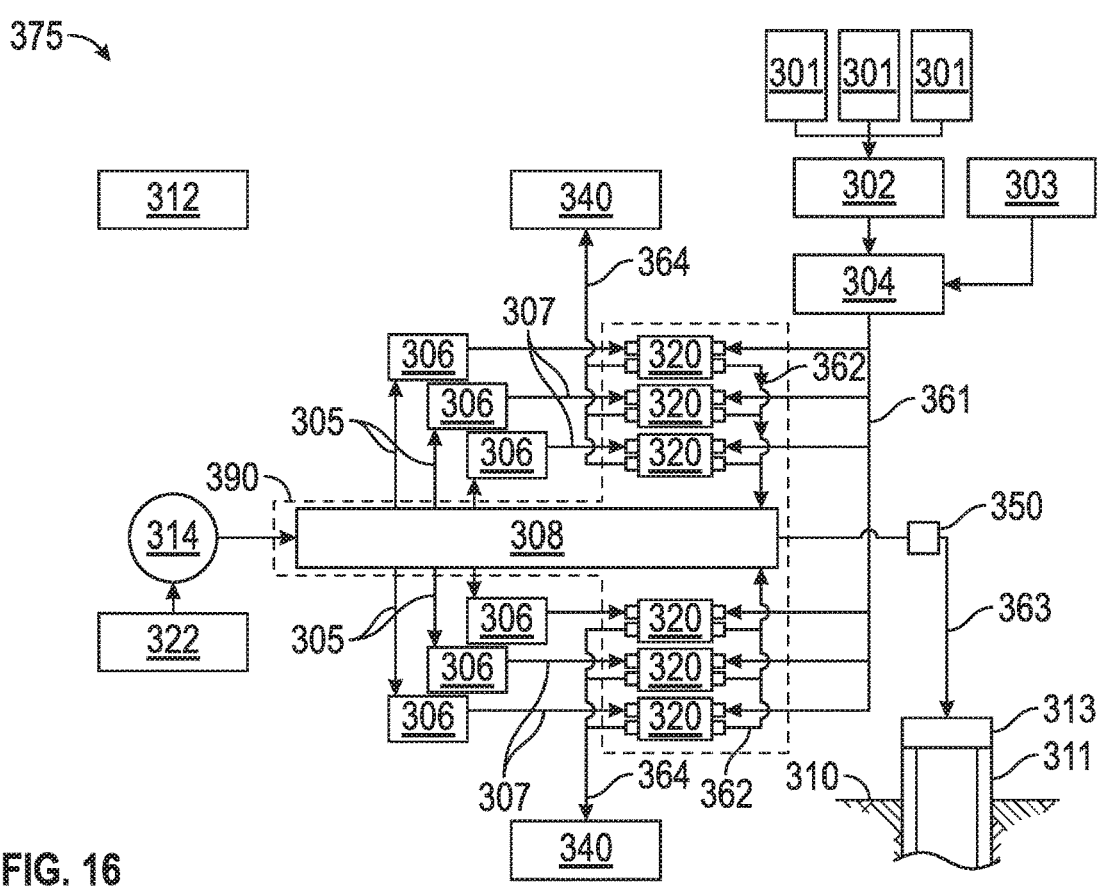
FIG. 16 is a schematic view of at least a portion of an example implementation of apparatus according to one or more aspects of the present disclosure.

FIG. 16 is a schematic view of an example implementation of another wellsite system 375 according to one or more aspects of the present disclosure. The wellsite system 375 is substantially similar in structure and operation to the wellsite system 373, including where indicated by like reference numbers, except as described below.

Unlike the wellsite system 373, the wellsite system 375 includes multiple instances of the fluid pressure exchanger 320 between the manifold 308 and a corresponding one of the pumps 306. The low-pressure discharge from the mixer 304 may be split into multiple streams each conducted to a corresponding one of the fluid pressure exchangers 320 via a corresponding conduit of a conduit system 361. The high-pressure discharge from each of the pumps 306 may be conducted to a corresponding one of the fluid pressure exchangers 320 via corresponding conduits 307. The pressurized fluid discharged from each fluid pressure exchanger 320 is returned to the manifold 308 for combination, via a conduit system 362, and then conducted towards the well 311 via a conduit system 363. The reduced-pressure discharge from the fluid pressure exchangers 320 may be combined or separately conducted to one or more tanks 340 via a conduit system 364.

One or more of the pressure exchangers 320 may be integrated or otherwise combined with the manifold 308 as a single unit or piece of wellsite equipment. For example, one or more of the pressure exchangers 320 and the manifold 308 may be combined to form a manifold 390 comprising fluid pathways and connections of the manifold 308 and one or more of the pressure exchangers 320 hard-piped or otherwise integrated with or along such fluid pathways and connections. Accordingly, the mixer 304 and each pump 306 may be fluidly connected with corresponding inlet ports of the manifold 390 instead of with individual inlet ports 331, 332 of the pressure exchangers 320. For example, the manifold 390 may comprise a plurality of clean fluid inlet ports each fluidly connected with a corresponding fluid conduit 307 to receive the clean fluid from the pumps 306. Each clean fluid inlet port may in turn be fluidly connected with the clean fluid inlet 332 of a corresponding pressure exchanger 320. The manifold 390 may further comprise a plurality of dirty fluid inlet ports, each fluidly connected with a corresponding fluid conduit of the conduit system 361 and operable to receive the dirty fluid from the mixer 304. Each dirty fluid inlet port may in turn be fluidly connected with the dirty fluid inlet 331 of a corresponding pressure exchanger 320. The manifold 390 may also comprise a plurality of clean fluid outlet ports, each fluidly connected with a corresponding fluid conduit of the conduit system 364 and operable to discharge the clean fluid from the manifold 390. Each clean fluid outlet port may in turn be fluidly connected with the clean fluid outlet 334 of a corresponding pressure exchanger 320. The manifold 390 may also comprise a dirty fluid outlet port fluidly connected with the conduit system 363 and operable to discharge the dirty fluid from the manifold 390. The dirty fluid outlet port may in turn be fluidly connected with the dirty fluid outlets 333 of the pressure exchangers 320.

Combinations of various aspects of the example implementations depicted in FIGS. 12-16 are also within the scope of the present disclosure. For example, the high-pressure side may comprise a dual-stage pumping scheme that pumps a clean fluid from the pumps 306 at a medium pressure and pumps flowback fluid into the clean fluid stream to increase the pressure of the pressurized fluid entering the fluid pressure exchanger 320.

A wellsite system within the scope of the present disclosure may be utilized to form a substantially continuous stream or supply of dirty fluid having a predetermined solids concentration before being pressurized by one or more pressure exchangers and injected into a well during a well treatment operation. For example, the solids concentration of the dirty fluid stream being formed and injected into the well may be held substantially constant during the well treatment operation. However, the solids concentration of the dirty fluid may be dynamically varied during the well treatment operation.

The present disclosure also introduces one or more features pertaining to an apparatus and method for controlling flow and/or pressure of low-pressure clean and dirty fluids flowing through pressure exchangers (i.e., between low-pressure inlets and low-pressure outlets) to reduce dirty fluid discharge pressure demands of a dirty fluid mixer located upstream from the low-pressure inlets of the pressure exchangers. Such apparatus and methods may permit use of pressure exchangers without increasing discharge pressure of the mixer, without utilizing additional dirty fluid booster pumps downstream from the mixer, or even permitting the mixer to be operated at lower discharge pressures.

FIGS. 17-21 are schematic views of a portion of an example implementation of wellsite systems 400-404, respectively, according to one or more aspects of the present disclosure. The wellsite systems 400-404 comprise one or more features of the wellsite systems 371-375 described above, including where indicated by like reference numbers, except as described below.

The wellsite systems 400-404 each comprise a plurality of pressure exchangers 320 collectively operable to pressurize a stream of low-pressure dirty fluid via a stream of pressurized clean fluid. On a dirty fluid side of the pressure exchangers 320 may be a low-pressure dirty fluid distribution manifold 412 configured to distribute or otherwise direct the low-pressure dirty fluid discharged from a mixer 304 (e.g., a blender), located at a distance from the pressure exchangers 320, into low-pressure dirty fluid inlets 331 of the pressure exchangers 320. The dirty fluid side of the pressure exchangers 320 may further include a high-pressure dirty fluid collection manifold 418 configured to collect the pressurized dirty fluid from high-pressure dirty fluid outlets 333 of the pressure exchangers 320. The pressurized dirty fluid may be transferred from the manifold 418 into an injection conduit 420 for injection into a well 311. On a clean fluid side of the pressure exchangers 320 may be a high-pressure clean fluid distribution manifold 416 configured to distribute or otherwise direct the pressurized clean fluid from one or more high-pressure pumps 306 into high-pressure clean fluid inlets 332 of the pressure exchangers 320 to pressurize and discharge the low-pressure dirty fluid received by the pressure exchangers 320. The clean fluid side of the pressure exchangers 320 may further include a low-pressure clean fluid collection manifold 422 configured to collect the low-pressure (i.e., depressurized) clean fluid discharged from low-pressure clean fluid outlets 334 of the pressure exchangers 320. The low-pressure clean fluid may be transferred from the manifold 422 into a discharge line 424 for transfer to a depressurized clean fluid destination, such as a storage container 340, the high-pressure pumps 306, and/or the mixer 304.

Figure 17:
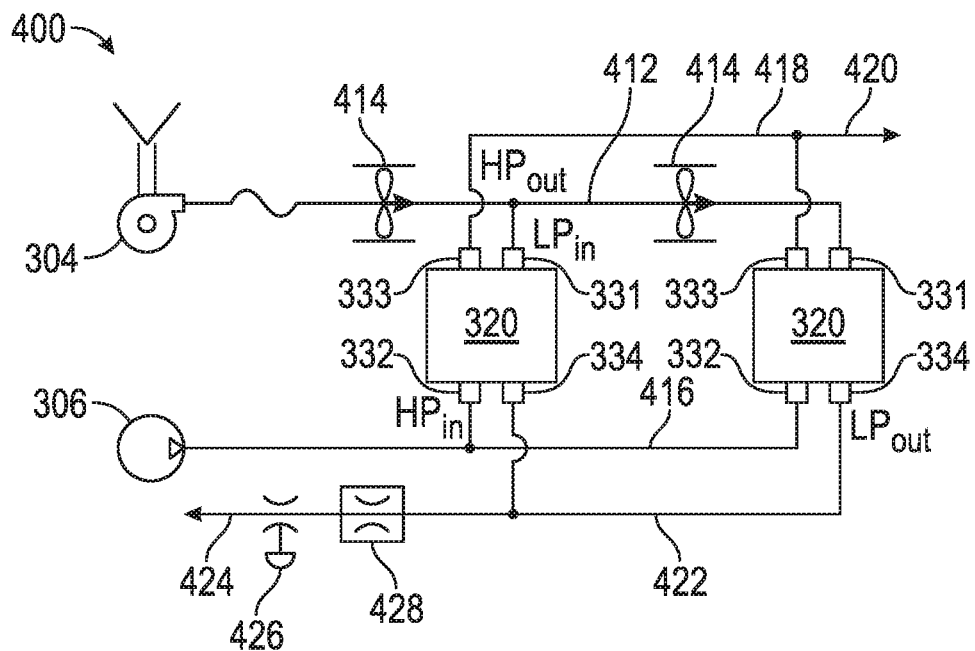
FIG. 17 is a schematic view of at least a portion of an example implementation of apparatus according to one or more aspects of the present disclosure.

FIG. 17 is a schematic view of a portion of an example implementation of the wellsite system 400 according to one or more aspects of the present disclosure. The wellsite system 400 comprises one or more features of the wellsite systems 371-375 described above, including where indicated by like reference numbers, except as described below. Accordingly, one or more aspects of the following description may also refer to one or more of FIGS. 1-16. Furthermore, although not shown in FIGS. 12-16, the various features associated with the wellsite system 400 may be implemented as part of the wellsite systems 371-375.

On the dirty fluid side of the pressure exchangers 320, the dirty fluid formed by the mixer 304 may be conveyed into the manifold 412. One or more axial flow or centrifugal pumps 414 may be coupled upstream from the low-pressure inlets 331 to provide a pressure boost to push the dirty fluid into the chambers of the pressure exchangers 320 and, thus, push the clean fluid out of the chambers via the low-pressure outlets 334. For example, the pump 414 may be provided at an inlet of the manifold 412 and/or two or more pumps 414 may be connected at two or more inlets 331. The pump 414 may be operable to decrease pressure demands at the outlet of the mixer 304 and increase the pressure at the inlets 331 and the outlets 334 of the pressure exchangers 320. Accordingly, the pumps 414 may facilitate an intended flow of the dirty and clean fluids through the pressure exchangers 320, without increasing discharge pressure of the mixer 304 or when operating the mixer 304 at a reduced discharge pressure.

On the clean fluid side of the pressure exchangers 320, the clean fluid from one or more of the water tanks 301 or the gel maker 302 may be pressurized by one or more of the pumps 306, injected into the manifold 416, and distributed among the pressure exchangers 320 via the high-pressure inlets 332. The pressurized clean fluid may then pressurize the dirty fluid received by the pressure exchangers 320, and the pressurized dirty fluid may be discharged into the manifold 418 via the high-pressure outlets 333. The pressurized dirty fluid may be conveyed and injected into the well 311 via the injection line 420. The depressurized clean fluid may be discharged from the pressure exchangers 320 into the manifold 422 via the outlets 334 and conveyed via the discharge line 424 toward the depressurized clean fluid destination, such as a settling tank/pit 318, 340 or a suction port of the mixer 304. One or more flow rate control valves 426 may be coupled along the discharge line 424 or at an outlet of the manifold 422 to control the flow rate and pressure of the low-pressure clean fluid being discharged from the pressure exchangers 320 via the outlets 334 and, thus, control the flow rate and pressure of the low-pressure dirty fluid being received by the pressure exchangers 320 via the inlets 331. For example, the flow rate control valve 426 may include an adjustable flow rate control valve, such as a needle valve, a metering valve, a butterfly valve, a globe valve, or another valve operable to progressively or gradually open and close to control the flow rate of the clean fluid. A flow meter 428 may also be fluidly connected along the discharge line 424 to monitor the flow rate of the clean fluid being discharged from the pressure exchangers 320.

Figure 18:
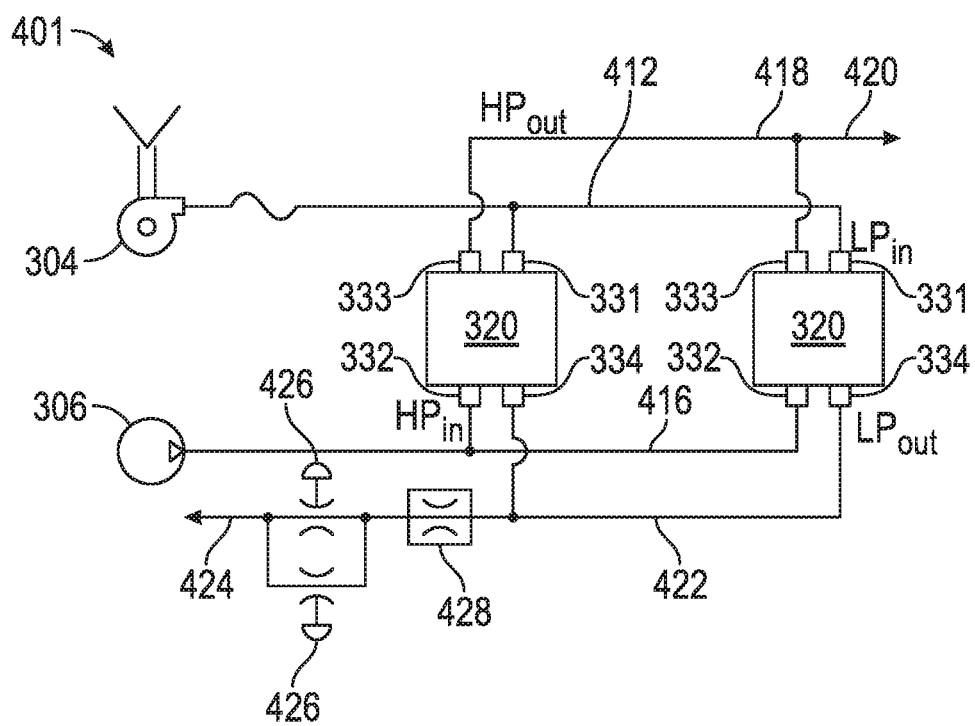
FIG. 18 is a schematic view of at least a portion of an example implementation of apparatus according to one or more aspects of the present disclosure.

FIG. 18 is a schematic view of an example implementation of a wellsite system 401 according to one or more aspects of the present disclosure. The wellsite system 401 comprises one or more features of the wellsite systems 371-375 and 400 described above, including where indicated by like reference numbers, except as described below. Accordingly, one or more aspects of the following description may also refer to one or more of FIGS. 1-17. Furthermore, although not shown in FIGS. 12-17, the various features associated with the wellsite system 401 may be implemented as part of the wellsite systems 371-375 and 400.

Similarly as described above, during pressurizing operations, the clean fluid may be discharged from the pressure exchangers 320 via the low-pressure outlets 334 into the manifold 422 and conveyed via the discharge line 424 toward the depressurized clean fluid destination. Two or more flow rate control valves 426 may be coupled in parallel along the discharge line 424 or at the outlet of the manifold 422 to control the flow rate and pressure of the low-pressure clean fluid being discharged from the pressure exchangers 320 via the outlets 334 and, thus, control the flow rate and pressure of the low-pressure dirty fluid being received by the pressure exchangers 320 via the low-pressure inlets 331. For example, the flow rate control valves 426 may be or comprise adjustable flow rate control valves, such as needle valves, metering valves, butterfly valves, globe valves, or other valves operable to progressively or gradually open and close to control the flow rate of the clean fluid. A flow meter 428 may also be fluidly connected along the discharge line 424.

The flow rate control valves 426 may be utilized to separate a control characteristic at high flow rates from the control characteristic at lower flow rates and to reduce the pressure drop at high flow rates. At low flow rates, the pressure drop through the pressure exchangers 320 may be a primary limiting factor, but at high flow rates, piping downstream from the pressure exchangers 320 may cause pressure losses that rise to levels comparable to pressure losses through the pressure exchangers 320. Thus, problems associated with generating sufficient flow through the pressure exchangers 320 arise at high flow rates. Two or more flow rate control valves 426 connected in parallel may be collectively operable to control flow rate of the clean fluid being discharged from the pressure exchangers 320 while causing a pressure drop that is substantially less than a pressure drop caused by utilizing just one flow rate control valve 426. Accordingly, the reduced pressure drop through the flow rate control valves 426 results in lower pressures at the outlets 334 and the inlets 331 of the pressure exchangers 320, decreasing pressure demands at the outlet of the mixer 304.

Figure 19:
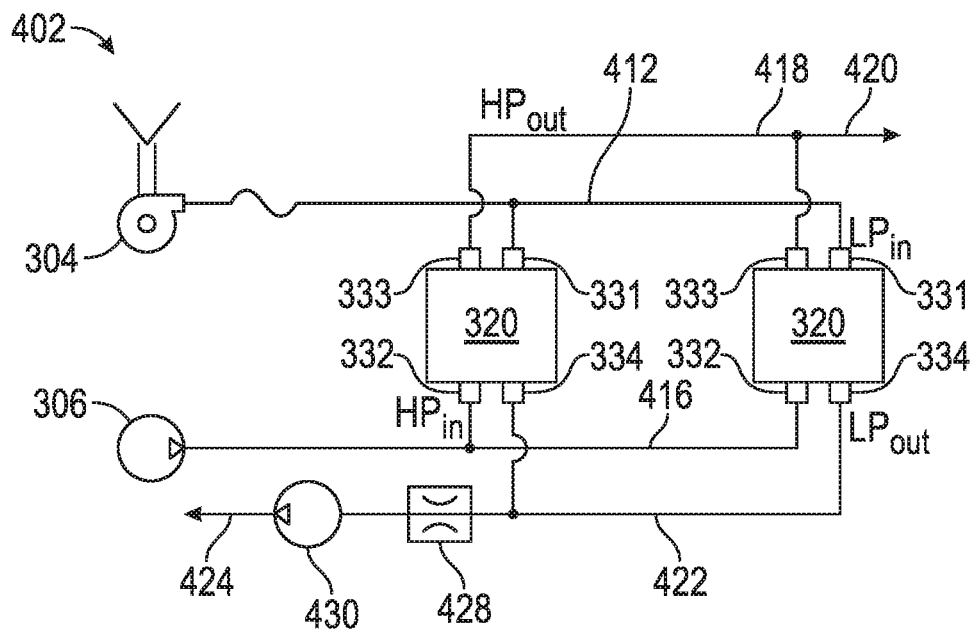
FIG. 19 is a schematic view of at least a portion of an example implementation of apparatus according to one or more aspects of the present disclosure.

FIG. 19 is a schematic view of an example implementation of a wellsite system 402 according to one or more aspects of the present disclosure. The wellsite system 402 comprises one or more features of the wellsite systems 371-375, 400, and 401 described above, including where indicated by like reference numbers, except as described below. Accordingly, one or more aspects of the following description may also refer to one or more of FIGS. 1-18. Furthermore, although not shown in FIGS. 12-18, the various features associated with the wellsite system 402 may be implemented as part of the wellsite systems 371-375, 400, and 401.

Similarly as described above, during pressurizing operations, the clean fluid may be discharged from the pressure exchangers 320 via the low-pressure outlets 334 into the manifold 422, and conveyed via the discharge line 424 toward the depressurized clean fluid destination. One or more positive displacement pumps 430 may be coupled downstream from the outlets 334 of the pressure exchangers 320, such as along the discharge line 424 or at an outlet of the manifold 422, to control the flow rate and pressure of the low-pressure clean fluid being discharged from the pressure exchangers 320 via the outlets 334 and, thus, control the flow rate and pressure of the low-pressure dirty fluid being received by the pressure exchangers 320 via the low-pressure inlets 331. The pump 430 may be operable to draw the clean fluid discharged via the outlets 334 and thereby reduce the pressure at both the outlets 334 and the inlets 331 of the pressure exchangers 320. Accordingly, the reduced pressures at the outlets 334 and the inlets 331 decrease pressure demands at the outlet of the mixer 304. The pump 430 may be a positive displacement pump, such as a gear pump, a lobe pump, a progressing cavity pump, or a plunger/piston pump, among other examples. A flow meter 428 may also be fluidly connected along the discharge line 424.

The pump 430 may operate as a pressure energy recovery device as the pump 430 airlocks out the clean fluid while regulating the flow rate of the clean fluid at low flow rates. At high flow rates, the pump 430 may be utilized to pump (i.e., increase suction) the clean fluid pressure at the outlets 334, which may be below atmospheric pressure, back to the tank 301 or the mixer 304 suction pressure. The pumping/power recovery achieved by the pump 430 may be relatively small, and may be further reduced by actively controlling the mixer 304 discharge pressure to minimize the intended power recovery.

Figure 20:
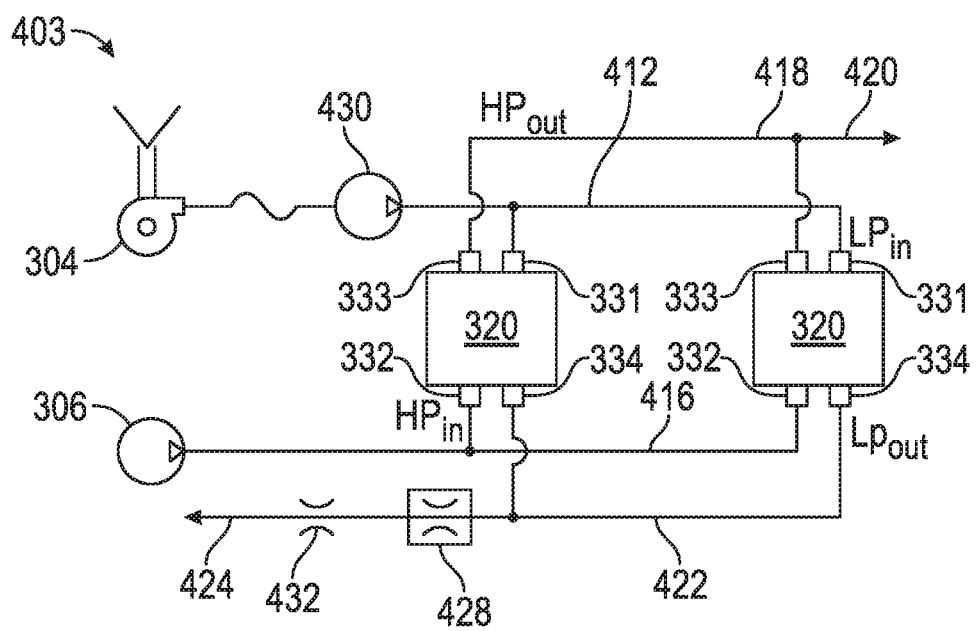
FIG. 20 is a schematic view of at least a portion of an example implementation of apparatus according to one or more aspects of the present disclosure.

FIG. 20 is a schematic view of an example implementation of a wellsite system 403 according to one or more aspects of the present disclosure. The wellsite system 403 comprises one or more features of the wellsite systems 371-375 and 400-402 described above, including where indicated by like reference numbers, except as described below. Accordingly, one or more aspects of the following description may also refer to one or more of FIGS. 1-19. Furthermore, although not shown in FIGS. 12-19, the various features associated with the wellsite system 403 may be implemented as part of the wellsite systems 371-375 and 400-402.

Similarly as described above, during pressurizing operations, the dirty fluid formed by the mixer 304 may be conveyed into the manifold 412 fluidly connected with the low-pressure inlets 331 of the pressure exchangers 320. One or more positive displacement pumps 430 may be coupled upstream from the inlets 331 of the pressure exchangers 320 and downstream from the outlet of the mixer 304 to provide a pressure boost to push the dirty fluid into the chambers of the pressure exchangers 320 via the inlets 331 and, thus, push the clean fluid out of the chambers via the low-pressure outlets 334. For example, the pump 430 may be connected at an inlet of the manifold 412. The pump 430 may be operable to decrease pressure demands at the outlet of the mixer 304 and increase the pressure at the inlets 331 and the outlets 334 of the pressure exchangers 320. A flow meter 428 may also be fluidly connected along the discharge line 424.

The clean fluid may be discharged from the pressure exchangers 320 via the outlets 334 into the manifold 422 and conveyed via a discharge line 424 toward the depressurized clean fluid destination. One or more pressure drop devices 432 may be coupled along the discharge line 424 or at the outlet of the manifold 422 to increase the pressure of the clean fluid being discharged from the pressure exchangers 320 and, thus, increase the pressure of the dirty fluid at the inlets 331 to prevent cavitation of the pump 430. The pressure drop device 432 may be a pinch valve, a flow rate control valve, a spring loaded check valve, or a flow restrictor or another fixed orifice, among other examples. Accordingly, the pump 430 and the pressure drop device 432 may collectively control the flow rate and pressure of the low-pressure dirty and clean fluids being passed through the pressure exchangers 320. The pump 430 and the pressure drop device 432 may facilitate an intended flow of the dirty and clean fluids through the pressure exchangers, without increasing discharge pressure of the mixer 304 or when operating the mixer 304 at a reduced discharge pressure.

Figure 21:
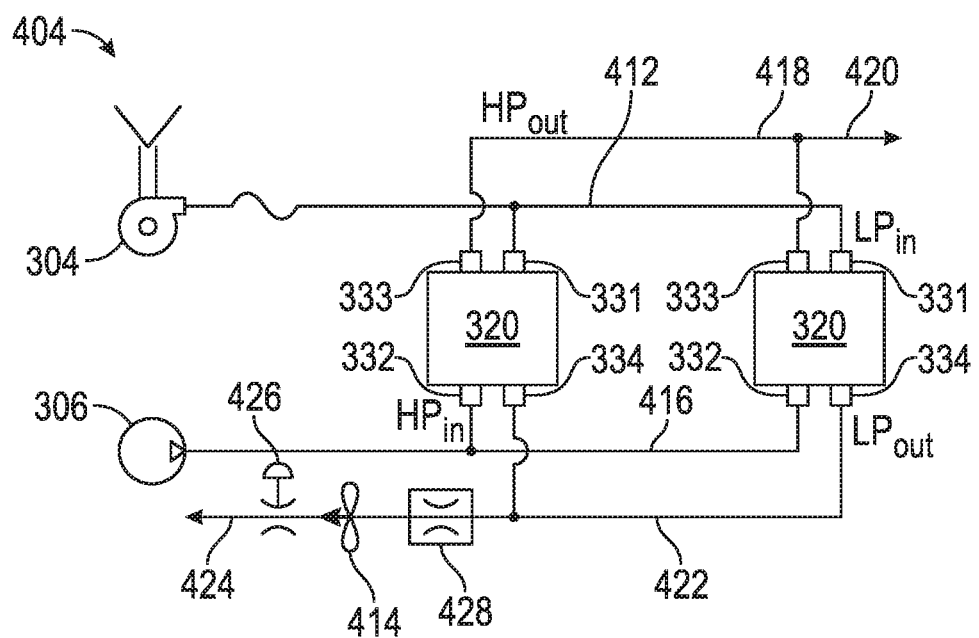
FIG. 21 is a schematic view of at least a portion of an example implementation of apparatus according to one or more aspects of the present disclosure.

FIG. 21 is a schematic view of an example implementation of a wellsite system 404 according to one or more aspects of the present disclosure. The wellsite system 404 comprises one or more features of the wellsite systems 371-375 and 400-403 described above, including where indicated by like reference numbers, except as described below. Accordingly, one or more aspects of the following description may also refer to one or more of FIGS. 1-20.

Furthermore, although not shown in FIGS. 12-20, the various features associated with the wellsite system 404 may be implemented as part of the wellsite systems 371-375 and 400-403.

Similarly as described above, during pressurizing operations, the clean fluid may be discharged from the pressure exchangers 320 via the low-pressure outlets 334 into the manifold 422 and conveyed via the discharge line 424 toward the depressurized clean fluid destination. One or more axial flow or centrifugal pumps 414 may be coupled along the discharge line 424 or at the outlet of the manifold 422 to control the flow rate and pressure of the low-pressure clean fluid being discharged from the pressure exchangers 320 via the outlets 334 and, thus, control the flow rate and pressure of the low-pressure dirty fluid being received by the pressure exchangers 320 via the low-pressure inlets 331. The pump 414 may be operable to draw the clean fluid discharged via the outlets 334 and thereby reduce the pressure at both the outlets 334 and the inlets 331 of the pressure exchangers 320. Accordingly, the reduced pressures at the outlets 334 and inlets 331 decrease pressure demands at the outlet of the mixer 304. An adjustable flow rate control valve 426 may be fluidly connected along the discharge line 424 downstream from the pump 414. The pump 414 may permit the pressure drop across the flow rate control valve 426 to be decoupled from the pressure at the outlets 334 of the mixer 304. A flow meter 428 may also be fluidly connected along the discharge line 424.

In view of the entirety of the present disclosure, including the figures and the claims, a person having ordinary skill in the art will readily recognize that the present disclosure introduces an apparatus comprising a fluid pressurizing system comprising: (A) a plurality of pressure exchangers each operable to: (1) receive a first fluid via a low-pressure inlet; (2) receive a second fluid via a high-pressure inlet to pressurize and discharge the first fluid via a high-pressure outlet; and (3) discharge the second fluid via a low-pressure outlet; and (B) a fluid control device fluidly connected with the pressure exchangers downstream from the low-pressure outlets.

The fluid control device may be or comprise a pump operable to draw the second fluid discharged via the low-pressure outlets and thereby reduce pressure at the low-pressure outlets and the low-pressure inlets. The pump may be a positive displacement pump, an axial pump, or a centrifugal pump. The fluid pressurizing system may comprise a flow rate control valve fluidly connected downstream from the pump.

The fluid control device may be or comprise two or more flow rate control valves connected in parallel and collectively operable to control flow rate of the second fluid while causing a pressure drop that is substantially less than a pressure drop caused by one flow rate control valve.

The fluid pressurizing system may comprise a pump fluidly connected downstream from an outlet of a source of the first fluid and upstream from the low-pressure inlets of the pressure exchangers, the pump may be operable to decrease pressure at the outlet of the source of the first fluid and increase pressure at the low-pressure inlets and the low-pressure outlets of the pressure exchangers, and the fluid control device may comprise a pressure loss device. In such implementations, among others within the scope of the present disclosure, the pump may be a positive displacement pump. In some implementations, the pump may be an axial pump or a centrifugal pump, and the pressure loss device may be or comprise a flow rate control valve.

The low-pressure outlets may be fluidly connected with a manifold, and the fluid control device may be connected at an outlet of the manifold.

The first fluid may be or comprise a dirty fluid comprising solid particles, the second fluid may be or comprise a clean fluid that is substantially free of solid particles, and the fluid pressurizing system may be or comprise a wellsite system operable to inject the dirty fluid into a wellbore during a well treatment operation.

The present disclosure also introduces an apparatus comprising a wellsite system operable to inject a dirty fluid into a wellbore during well treatment operation, wherein the wellsite system comprises: (A) a first pump operable to pressurize a clean fluid; (B) a mixer operable to form a dirty fluid; (C) a plurality of pressure exchangers fluidly connected with the first pump, the mixer, and the wellbore, wherein each pressure exchanger is operable to: (1) receive the dirty fluid from the mixer via a low-pressure inlet; (2) receive the pressurized clean fluid from the first pump via a high-pressure inlet to thereby pressurize and then discharge the received dirty fluid via a high-pressure outlet; and (3) discharge the clean fluid via a low-pressure outlet; and (D) a second pump fluidly connected with the pressure exchangers downstream from the low-pressure outlets, wherein the second pump is operable to draw the clean fluid discharged via the low-pressure outlets and thereby reduce pressure at the low-pressure outlets and the low-pressure inlets.

The second pump may be a positive displacement pump, an axial pump, or a centrifugal pump. The wellsite system may comprises a flow rate control valve fluidly connected downstream from the second pump.

The wellsite system may comprises a third pump fluidly connected downstream from an outlet of the mixer and upstream from the low-pressure inlets of the pressure exchangers, and the third pump may be operable to decrease pressure at the outlet of the mixer. The third pump may be a positive displacement pump, an axial pump, or a centrifugal pump.

The low-pressure outlets of the pressure exchangers may be fluidly connected with a manifold, and the second pump may be connected at an outlet of the manifold.

The present disclosure also introduces a method comprising: (A) operating a plurality of pressure exchangers by: (1) injecting a first fluid into the pressure exchangers via corresponding low-pressure inlets of the pressure exchangers; (2) injecting a second fluid into the pressure exchangers via corresponding high-pressure inlets of the pressure exchangers to thereby pressurize and then discharge the first fluid via corresponding high-pressure outlets of the pressure exchangers; and (3) discharging the second fluid out of the pressure exchangers via corresponding low-pressure outlets of the pressure exchangers; and (B) operating a pump to draw the second fluid discharged via the low-pressure outlets and thereby reduce the pressure at the low-pressure outlets and the low-pressure inlets.

The pump may be a positive displacement pump, an axial pump, or a centrifugal pump. The method may further comprise controlling flow of the second fluid discharged by the pump via a flow rate control valve connected downstream from the pump to control flow of the first fluid being injected into the pressure exchangers via the corresponding low-pressure inlets.

The pump may be a first pump, and the method may comprise operating a second pump fluidly connected downstream from an outlet of a source of the first fluid and upstream from the low-pressure inlets of the pressure exchangers to decrease pressure at the outlet of the source of the first fluid. The second pump may be a positive displacement pump, an axial pump, or a centrifugal pump.

The low-pressure outlets may be fluidly connected with a manifold, and the pump may be connected at an outlet of the manifold.

The first fluid may be or comprise a dirty fluid comprising solid particles, the second fluid may be or comprise a clean fluid that is substantially free of solid particles, and the method may comprise injecting the dirty fluid into a wellbore during a well treatment operation.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the implementations introduced herein. A person having ordinary skill in the art should also realize that such equivalent constructions do not depart from the spirit and scope of the present disclosure, and that they may make various changes, substitutions, and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. An apparatus comprising:
    a fluid pressurizing system comprising:
        a plurality of pressure exchangers each operable to:
            receive a first fluid via a low-pressure inlet;
            receive a second fluid via a high-pressure inlet to pressurize and
            discharge the first fluid via a high-pressure outlet; and
            discharge the second fluid via a low-pressure outlet; and
        a fluid control device fluidly connected with the pressure exchangers downstream from the low-pressure outlets, wherein the fluid control device comprises two or more flow rate control valves connected in parallel along a discharge line, connected in fluid communication with the low-pressure outlets, and collectively operable to control a flow rate of the second fluid while causing a pressure drop that is substantially less than a pressure drop caused by one flow rate control valve.

2. The apparatus of claim 1 wherein the fluid control device comprises a pump operable to draw the second fluid discharged via the low-pressure outlets and thereby reduce pressure at the low-pressure outlets and the low-pressure inlets.

3. The apparatus of claim 2 wherein the pump comprises a positive displacement pump.

4. The apparatus of claim 2 wherein the pump comprises an axial pump or a centrifugal pump.

5. The apparatus of claim 4 wherein the fluid pressurizing system further comprises the two or more flow rate control valves fluidly connected downstream from the pump.

6. The apparatus of claim 1 wherein the fluid pressurizing system further comprises a pump fluidly connected downstream from an outlet of a source of the first fluid and upstream from the low-pressure inlets of the pressure exchangers, wherein the pump is operable to decrease pressure at the outlet of the source of the first fluid and increase pressure at the low-pressure inlets and the low-pressure outlets of the pressure exchangers, and wherein the fluid control device comprises a pressure loss device.

7. The apparatus of claim 6 wherein the pump comprises a positive displacement pump.

8. The apparatus of claim 6 wherein the pump comprises an axial pump or a centrifugal pump, and wherein the pressure loss device comprises the two or more flow rate control valves.

9. The apparatus of claim 1 wherein the low-pressure outlets are fluidly connected with a manifold, and wherein the fluid control device is connected to an outlet of the manifold.

10. The apparatus of claim 1 wherein the first fluid is or comprises a dirty fluid comprising solid particles, wherein the second fluid is or comprises a clean fluid that is substantially free of solid particles, and wherein the fluid pressurizing system comprises a wellsite system operable to inject the dirty fluid into a wellbore during a well treatment operation.

11. An apparatus comprising:
    a wellsite system operable to inject a dirty fluid into a wellbore during a well treatment operation, wherein the wellsite system comprises:
        a first pump operable to pressurize a clean fluid to a high-pressure greater than 5000 psi;
        a mixer operable at a suction pressure to form a dirty fluid;
        a plurality of pressure exchangers fluidly connected with the first pump, the mixer, and the wellbore, wherein each pressure exchanger is operable to:
            receive the dirty fluid from the mixer via a low-pressure inlet;
            receive the pressurized clean fluid from the first pump via a high-pressure inlet to thereby pressurize and then discharge the received dirty fluid via a high-pressure outlet; and
            discharge the clean fluid via a low-pressure outlet; and
        a second pump fluidly connected with the pressure exchangers downstream from the low-pressure outlets, wherein the second pump is operable to draw the clean fluid discharged via the low-pressure outlets and thereby reduce pressure at the low-pressure outlets and the low-pressure inlets, wherein the low-pressure outlets of the pressure exchangers are fluidly connected with a manifold, the second pump is connected to an outlet of the manifold, wherein the second pump is operable to pressurize the discharged clean fluid from the low-pressure outlets to an atmospheric pressure or the suction pressure.

12. The apparatus of claim 11 wherein the second pump comprises a positive displacement pump.

13. The apparatus of claim 11 wherein the second pump comprises an axial pump or a centrifugal pump.

14. The apparatus of claim 13 wherein the wellsite system further comprises a flow rate control valve fluidly connected downstream from the second pump.

15. The apparatus of claim 11 wherein the wellsite system further comprises a third pump fluidly connected downstream from an outlet of the mixer and upstream from the low-pressure inlets of the pressure exchangers, and wherein the third pump is operable to decrease pressure at the outlet of the mixer.

16. The apparatus of claim 15 wherein the third pump comprises a positive displacement pump.

17. The apparatus of claim 15 wherein the third pump comprises an axial pump or a centrifugal pump.

18. A method comprising:
operating a plurality of pressure exchangers by:
- injecting a first fluid from a source into the pressure exchangers via corresponding low-pressure inlets of the pressure exchangers;
- injecting a second fluid into the pressure exchangers via corresponding high-pressure inlets of the pressure exchangers to thereby pressurize and then discharge the first fluid via corresponding high-pressure outlets of the pressure exchangers; and
- discharging the second fluid out of the pressure exchangers via corresponding low-pressure outlets of the pressure exchangers to a manifold comprising an outlet; and operating a pump fluidly connected to the outlet of the manifold to draw the second fluid discharged via the low-pressure outlets and thereby reduce the pressure at the low-pressure outlets and the low-pressure inlets, wherein the pump is operable to direct the discharged second fluid from the manifold to the source or a tank.

19. The method of claim 18 wherein the pump comprises a positive displacement pump.

20. The method of claim 18 wherein the pump comprises an axial pump or a centrifugal pump.

21. The method of claim 20 further comprising controlling flow of the second fluid discharged by the pump via a flow rate control valve connected downstream from the pump to control flow of the first fluid being injected into the pressure exchangers via the corresponding low-pressure inlets.

22. The method of claim 18 wherein the pump comprises a first pump, and wherein the method further comprises operating a second pump fluidly connected downstream from an outlet of the source of the first fluid and upstream from the low-pressure inlets of the pressure exchangers to decrease pressure at the outlet of the source of the first fluid.

23. The method of claim 22 wherein the second pump comprises a positive displacement pump.

24. The method of claim 22 wherein the second pump comprises an axial pump or a centrifugal pump.

25. The method of claim 18 wherein the first fluid comprises a dirty fluid comprising solid particles, wherein the second fluid is or comprises a clean fluid that is substantially free of solid particles, and wherein the method further comprises injecting the dirty fluid into a wellbore during a well treatment operation.

26. The method of claim 18, wherein injecting the second fluid into the pressure exchangers thereby pressurizes and then discharges the first fluid at a high pressure greater than 5000 psi from the pressure exchangers.

* * * * *